United States Patent
Shah et al.

(10) Patent No.: US 12,291,243 B2
(45) Date of Patent: May 6, 2025

(54) SYSTEMATIC APPROACH TOWARDS SYSTEM IDENTIFICATION BASED YAW RATE ESTIMATION WITH LOW-COST IMU+GPS UNITS

(71) Applicant: Ridecell, Inc., San Francisco, CA (US)

(72) Inventors: Nirav Atul Shah, Santa Clara, CA (US); Kshitij Kumbar, Fremont, CA (US); Kamuran Turkoglu, San Jose, CA (US)

(*) Notice: Subject to any disclaimer, the term of this patent is extended or adjusted under 35 U.S.C. 154(b) by 218 days.

(21) Appl. No.: 17/714,789

(22) Filed: Apr. 6, 2022

(65) Prior Publication Data

US 2022/0332352 A1     Oct. 20, 2022

Related U.S. Application Data

(60) Provisional application No. 63/171,947, filed on Apr. 7, 2021.

(51) Int. Cl.
*B60W 60/00* (2020.01)
*B60W 50/00* (2006.01)
(Continued)

(52) U.S. Cl.
CPC ........ *B60W 60/0027* (2020.02); *B60W 50/00* (2013.01); *G05B 17/02* (2013.01);
(Continued)

(58) Field of Classification Search
CPC ............. B60W 60/0027; B60W 50/00; B60W 2554/4042; B60W 2050/0028;
(Continued)

(56) References Cited

U.S. PATENT DOCUMENTS 8,041,491 B2 * 10/2011 Tan ..................... B60G 17/0162
701/72
9,507,346 B1 * 11/2016 Levinson ............ G06F 3/04847
(Continued)

FOREIGN PATENT DOCUMENTS

FR          3101306 A1    4/2021
WO   2020/193860 A1   10/2020

OTHER PUBLICATIONS

Jun Deng et al., Machine Learning Driven Method for Indoor Positioning Using Inertial Measurement Unit, Sep. 29, 2020, IEEE Xplore, pp. 1-4 (pdf).*
(Continued)

*Primary Examiner* — Manglesh M Patel
(74) *Attorney, Agent, or Firm* — Larry E. Henneman, Jr.; Henneman & Associates, PLC

(57) ABSTRACT

Systems and methods facilitate estimating values of dynamic attributes of autonomous vehicles. A first vehicle includes an inertial measurement unit (IMU) configured to measure a dynamic attribute (e.g., rate of change of vehicle yaw angle) and correlate the measured attribute with one or more input variables (e.g., values of steering angle commands). The correlated data is used to generate a model that can be used in a second vehicle to predict a dynamic attribute based at least in part on variable values input from the second vehicle. As a result, it is not necessary for the second vehicle to have an IMU.

22 Claims, 24 Drawing Sheets

(51) Int. Cl.
*G05B 17/02* (2006.01)
*G07C 5/02* (2006.01)

(52) U.S. Cl.
CPC ....... *G07C 5/02* (2013.01); *B60W 2050/0028* (2013.01); *B60W 2510/20* (2013.01); *B60W 2520/06* (2013.01); *B60W 2520/14* (2013.01); *B60W 2554/4042* (2020.02)

(58) Field of Classification Search
CPC ......... B60W 2510/20; B60W 2520/06; B60W 2520/14; G05B 17/02; G07C 5/02; G05D 1/0061; G05D 1/0088; G05D 1/021; G05D 1/0214; G05D 1/0221; G05D 1/0223
USPC .............................. 701/24, 29.3, 30.2, 30.4
See application file for complete search history.

(56) References Cited

U.S. PATENT DOCUMENTS

| | | | | |
|---|---|---|---|---|
| 10,713,727 | B1* | 7/2020 | Floyd | H04L 9/50 |
| 10,807,591 | B1* | 10/2020 | Kentley-Klay | G08B 21/10 |
| 11,681,299 | B2* | 6/2023 | Tiwari | G05D 1/0257 |
| | | | | 701/24 |
| 2017/0213149 | A1* | 7/2017 | Micks | G06N 3/088 |
| 2017/0262790 | A1* | 9/2017 | Khasis | G01C 21/3415 |
| 2018/0203445 | A1* | 7/2018 | Micks | G06F 30/15 |
| 2018/0253109 | A1* | 9/2018 | Fontaine | B60C 23/0479 |
| 2018/0330173 | A1 | 11/2018 | Zhu et al. | |
| 2019/0315351 | A1 | 10/2019 | Smith et al. | |
| 2020/0238999 | A1 | 7/2020 | Batts et al. | |
| 2020/0257291 | A1 | 8/2020 | Zhang et al. | |
| 2020/0339134 | A1 | 10/2020 | Pennala et al. | |
| 2021/0063162 | A1 | 3/2021 | Moskowitz et al. | |
| 2021/0096570 | A1* | 4/2021 | Engle | G05D 1/0276 |
| 2021/0171050 | A1* | 6/2021 | Han | G01M 17/04 |
| 2021/0197852 | A1* | 7/2021 | Fairfield | B60W 40/04 |
| 2023/0192127 | A1* | 6/2023 | Funke | B60W 30/025 |
| | | | | 701/25 |
| 2023/0256994 | A1* | 8/2023 | Stumpf | B60W 60/00 |
| | | | | 701/26 |
| 2023/0286532 | A1* | 9/2023 | Gerrese | B60W 60/0013 |
| 2023/0356556 | A1* | 11/2023 | Subramanian | B60C 23/002 |

OTHER PUBLICATIONS

PCT Application Serial No. PCT/US22/23747, International Search Report and Written Opinion dated Jul. 1, 2022.
European Application No. 22785411.4, Extended European Search Report dated Jan. 20, 2025.

* cited by examiner

SYSTEMATIC APPROACH TOWARDS SYSTEM IDENTIFICATION BASED YAW RATE ESTIMATION WITH LOW-COST IMU+GPS UNITS

RELATED CASES

The present application claims priority to U.S. Provisional Patent Application No. 63/171,947 filed on Apr. 7, 2021 by at least one common inventor and entitled "A Systematic Approach Towards System Identification Based Yaw Rate Estimation with Low-Cost IMU+GPS Units", which is incorporated herein in its entirety.

BACKGROUND OF THE INVENTION

Field of the Invention

This invention relates generally to autonomous vehicles, and more particularly to estimating autonomous vehicle dynamics from control inputs.

Description of the Background Art

It is well known that over 90% of road accidents occur due to driver error. To overcome this there have been significant efforts in making autonomous vehicles, i.e. vehicles that do not require a human driver, using improved sensing and control techniques. Autonomous driving and autonomously driving vehicles are produced to enhance safety and reduce fatalities in our daily encounters. To achieve such a critical mission, autonomous vehicles rely heavily on sensor information to first detect and observe the environmental conditions, and then to decide what to do, how to do it, and when to do it. When operating in a safety critical manner, reliable, robust, and meaningful sensor measurements become vital.

Known autonomous vehicles include location determining systems (e.g. global positioning systems (GPS) receivers) and wireless communications systems (e.g. cellular modems). These systems are utilized to determine the location of the vehicle, communicate the location of the vehicle (if necessary), and receive route instructions based at least in part on the location of the vehicle. The route instructions are considered (in addition to input from other sensors) by the onboard computer in order to determine the most appropriate maneuvers for traveling to a desired location.

Autonomous vehicles are additionally equipped with systems (e.g. sensors) for detecting other vehicles, road markings, road signs, pedestrians, and other relevant objects in their surroundings. These systems additionally aid in localization of the vehicle (i.e., in determining where the vehicle is located in the environment). Data from these sensors is input into an onboard computer system capable of directing the vehicle's movement based on the data received from the sensors. The onboard computer system provides output to the vehicle's controls in order to cause the vehicle to accelerate, decelerate, brake, steer, reverse, etc. The onboard computer must determine the most appropriate maneuvers based on the input from the sensors in order to, for example, avoid collisions, obey traffic laws, etc.

Additionally, autonomous vehicles include systems (e.g., additional sensors, computers, etc.) for determining the dynamics of the vehicle in real time. In some cases, the output from these sensors provides an accurate depiction of the motion of the vehicle. However, these sensors are often very expensive and, thus, cost-prohibitive for most consumer vehicles. In other cases, cheaper sensors can be utilized along with some computer modeling to produce an estimate of the motion of the vehicle. However, this modeling often fails to account for real-world uncertainty, is subject to errors in parameter estimation, and is subject to errors in input states. Other forms of data driven computer modeling are difficult to understand, verify, and/or validate, and require non-trivial amounts of training data that may not be available.

In particular, lateral stability, which is of primary interest from the point of view of vehicle autonomy and safety, requires the accurate modelling and estimation of the lateral dynamics of the vehicle. The lateral dynamics contain several nonlinearities due to the interaction between various quantities of interest like lateral velocity, acceleration, yaw rate, slip angles, etc. Besides this, the tire model, which itself is a major topic of research, although considered linear in nature during normal vehicle domain, demonstrates nonlinearity during out of operational design domain (ODD), emergency-like vehicle situations like sharp turns and loss in traction. Getting detailed data for a tire model can be difficult as these are usually considered confidential by original equipment manufacturers (OEMs).

SUMMARY

Systems and methods for estimating values of dynamic attributes of autonomous vehicles are disclosed.

An example method for estimating a dynamic variable associated with a moving vehicle includes providing a first vehicle being at least partially capable of autonomous driving. The first vehicle includes a first inertial measurement unit (IMU) configured to measure a dynamic attribute associated with motion of the first vehicle. The example method further includes identifying a first input variable, and the first dynamic attribute depends at least indirectly on the first input variable. The example method additionally includes measuring values of the first dynamic attribute and corresponding values of the first input variable during a particular time frame while the first vehicle is in motion. The example method additionally includes identifying a first relationship between the measured values of the first dynamic attribute and the measured values of the first input variable during the particular time frame. The example method additionally includes generating a model based at least in part on the relationship. The model can be configured to predict an output value of the first dynamic attribute based at least in part on an input value of the first input variable. The example method can additionally include providing the model to a second vehicle and using the model to estimate an output value of the first dynamic attribute associated with motion of the second vehicle. The estimate can be based at least in part on an input value of the first input variable from the second vehicle. The estimated value of the second dynamic attribute of the second vehicle can depend at least indirectly on the value of the first input variable from the second vehicle.

In a more particular example method, the first dynamic attribute can be a rate of change of a vehicle yaw angle. Additionally, the first input variable can represent values of steering angle commands input to vehicle steering systems.

In an example method, the step of identifying the first relationship between the measured values of the first dynamic attribute and the measured values of first input variable during the particular time frame can include identifying a second relationship and a third relationship. The second relationship can be between the measured values of the first input variable and measured values of a first intermediate variable. The third relationship can be between the measured values of the first intermediate variable and the measured values of the first dynamic attribute. Identifying the first relationship can then be based at least in part on the second relationship and the third relationship.

In an example method, the measured values of the first intermediate variable can be measures of curvatures of paths of the first vehicle. The model can be configured to multiply a second input value corresponding to a longitudinal velocity of the second vehicle by the curvature of the path of the second vehicle to generate an estimate of the rate of change of vehicle yaw angle of the second vehicle.

In an example method, the step of identifying the first relationship between the measured values of the first dynamic attribute and the measured values of the first input variable during the particular time frame can include identifying a fourth relationship and a fifth relationship. The fourth relationship can be between the measured values of the first input variable and measured values of a second intermediate variable. The fifth relationship can be between the measured values of the second intermediate variable and the measured values of the first intermediate variable. Then, identifying the first relationship can be based at least in part on the fourth relationship and the fifth relationship. The second intermediate variable can, for example, represent an angle of a steering tire with respect to a reference line associated with the first vehicle.

In an example method, the step of generating the model based at least in part on the first relationship can include modeling the fourth relationship and the fifth relationship. The fourth relationship can be modeled as a first transfer function relating the first input variable and the second intermediate variable in a first linear time invariant system. The fifth relationship can be modeled as a second transfer function relating the second intermediate variable and the first intermediate variable in a second linear time invariant system. Then, the step of generating the model based at least in part on the first relationship can include combining the first transfer function and the second transfer function to generate a combined transfer function relating the first input variable and the first intermediate variable in a third linear time invariant system.

In an example method, the step of generating the model based at least in part on the first relationship includes generating the model based at least in part on a kinematic relationship between the first dynamic attribute and the first input variable.

In an example method, the second vehicle can include a second IMU configured to measure values corresponding to the dynamic attribute associated with the second vehicle. The first IMU can have a first accuracy, and the second IMU can have a second accuracy. The first accuracy can be greater than the second accuracy. In other words, the second IMU can be less accurate, and therefore less expensive, than the first IMU.

An example system for estimating a dynamic variable associated with a moving vehicle is disclosed. The example system includes a first vehicle, a hardware processor, a hardware interface, and memory. The first vehicle includes a first inertial measurement unit (IMU) configured to measure values of a dynamic attribute associated with motion of the first vehicle. The first vehicle can be at least partially capable of autonomous driving. The hardware processor can be configured to execute code. The code can include a set of native instructions configured to cause the hardware processor to perform a corresponding set of operations when executed by the hardware processor. The hardware interface can be electrically coupled to the hardware processor and configured to receive driving data recorded at least in part by the first IMU. The driving data can include measured values corresponding to a first input variable and the first dynamic attribute during a particular time frame while the first vehicle is in motion. The first dynamic attribute depends at least indirectly on the first input variable. The memory can storing data and the code. The data can include the driving data. The code can include a first, second, and third subset of the native instructions. The first subset of the set of native instructions can be configured to identify a first relationship between values of the first dynamic attribute and values of the first input variable measured during the particular time frame. The second subset of the set of native instructions can be configured to generate a model based at least in part on the first relationship. The model can be configured to predict an output value of the first dynamic attribute from an input value of the first input variable. The third subset of the set of native instructions can be configured to provide the model for use in a second vehicle, thereby facilitating the use of the model to estimate values of the dynamic attribute associated with motion of the second vehicle, based at least in part on values of the input variable. The values of the dynamic attribute can depend at least indirectly on the values of the input variable.

In a particular example systems, the first dynamic attribute can a rate of change of a vehicle yaw angle, and the first input variable can represent values of a first steering angle command input to a first steering system of the first vehicle.

In an example system, the first subset of the set of native instructions can be additionally configured to identify a second relationship and a third relationship. The second relationship can be between the measured values of the first input variable and measured values of a first intermediate variable. The third relationship can be between the measured values of the first intermediate variable and the measured values of the first dynamic attribute. Then, the first relationship can be identified based at least in part on the second relationship and the third relationship.

In an example system, the values of the intermediate variable can represent measures of curvatures of paths of the first vehicle. The model can be configured to multiply a second input value indicative of a longitudinal velocity of the first vehicle by the curvature of the path of the first vehicle to generate an estimate of the rate of change of the yaw angle of the first vehicle.

In an example system, the first subset of the set of native instructions can be additionally configured to identify a fourth relationship and a fifth relationship. The fourth relationship can be between the measured values of the first input variable and measured values of a second intermediate variable. The fifth relationship can be between the measured values of the second intermediate variable and the measured values of the first intermediate variable. Then, the first relationship can be identified based at least in part on the fourth relationship and the fifth relationship. The second intermediate variable can represent, for example, an angle of a steering tire with respect to a reference line associated with the first vehicle.

In an example system, the second subset of the set of native instructions can be additionally configured to model the fourth relationship and model the fifth relationship. The fourth relationship can be modeled as a first transfer function relating the first input variable and the second intermediate variable in a first linear time invariant system. The fifth relationship can be modeled as a second transfer function relating the second intermediate variable and the first intermediate variable in a second linear time invariant system. The second subset of the set of native instructions can additionally be configured to combine the first transfer function and the second transfer function to generate a combined transfer function relating the first input variable and the first intermediate variable in a third linear time invariant system.

In an example system, the second subset of the set of native instructions can additionally be configured to generate the model based at least in part on a kinematic relationship between the dynamic attribute and the first input variable.

An example system can additionally include the second vehicle. The second vehicle can include a second IMU configured to measure at least said dynamic variable associated with the second vehicle. The first IMU has a first accuracy relative to measuring said dynamic variable, and the second IMU has a second accuracy relative to measuring said dynamic variable. The first accuracy can be greater than the second accuracy. The second accuracy can be less than the first accuracy.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a model for estimating the yaw rate of an autonomous vehicle. In the following description, numerous specific details are set forth (e.g., specific vehicle type, specific network type, particular data sets, etc.) in order to provide a thorough understanding of the invention. Those skilled in the art will recognize, however, that the invention may be practiced apart from these specific details. In other instances, details of well-known autonomous driving practices (e.g., routine optimization) and components have been omitted, so as not to unnecessarily obscure the present invention.

Figure 1:
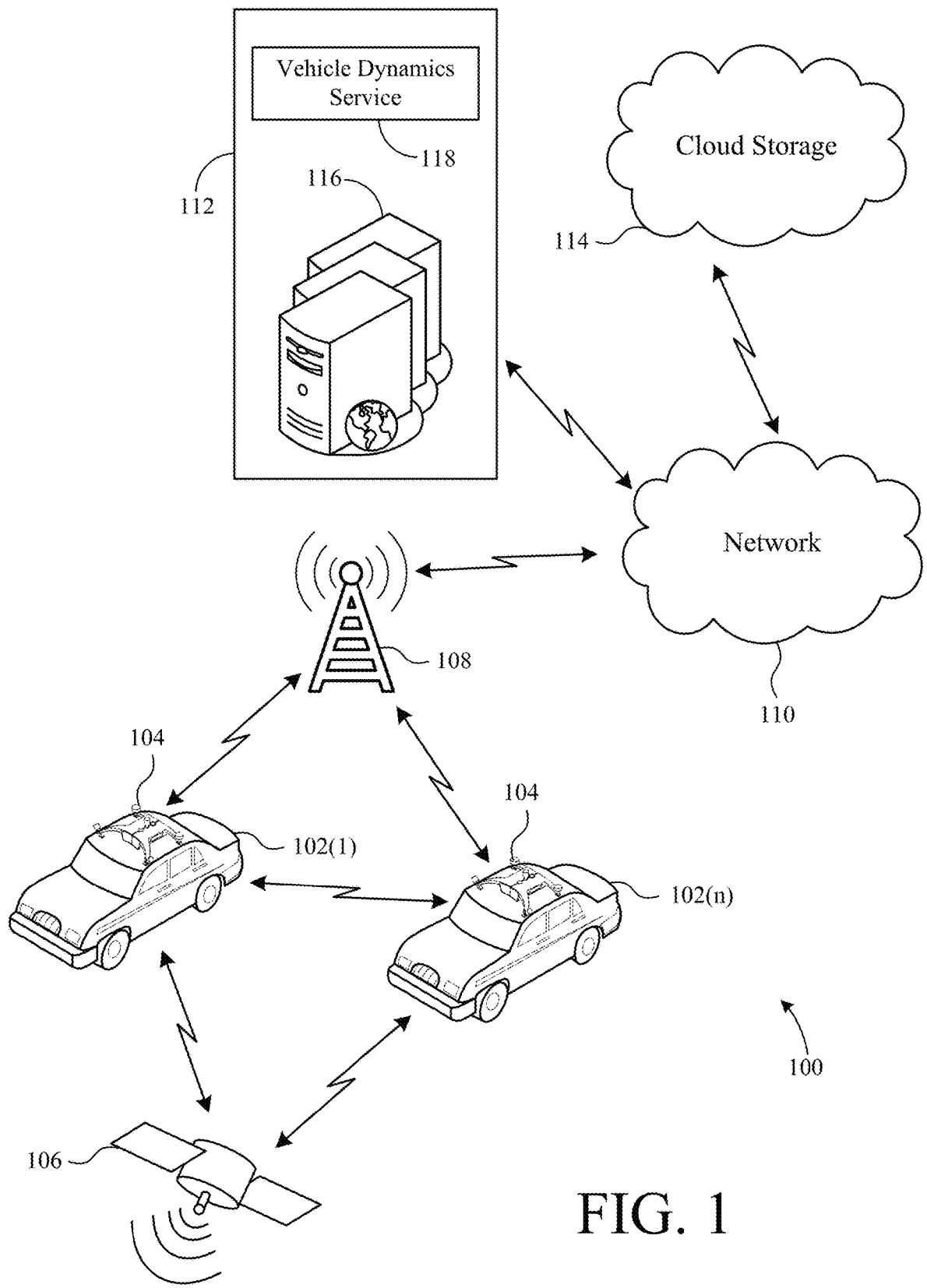
FIG. 1 is a block diagram showing an example fleet of vehicles communicating with a remote data computing system.

FIG. 1 shows an autonomous vehicle infrastructure 100, including a fleet of autonomous vehicles 102(1-$n$). In the example embodiment, the fleet of autonomous vehicles can include original equipment autonomous vehicles and/or legacy vehicles (i.e., vehicles originally intended to be piloted by a human) that are outfitted with a detachable sensor unit 104 that includes a plurality of sensors (e.g., cameras, radar, LiDAR, etc.). The sensors enable the legacy vehicle to be piloted in the same way as a contemporary autonomous vehicle, by generating and providing data indicative of the surroundings of the vehicle. More information regarding detachable sensor units can be found in U.S. patent application Ser. No. 16/830,755, filed on Mar. 26, 2020 by Anderson et al., which is incorporated herein by reference in its entirety. In alternate embodiments, vehicles 102(1-$n$) can include any vehicles outfitted with one or more sensors, whether or not the vehicles are capable of being piloted autonomously.

For ease of operation, vehicles 102 should be able to identify their own locations. To that end, vehicles 102 receive signals from a plurality of global positioning system (GPS) satellites 106. The present location of the vehicle can be determined by comparing the timing of the signals received from GPS satellites 106. The determined location is utilized by vehicles 102 to determine intended routes and to navigate along the routes.

Vehicles 102 can also communicate with riders, administrators, technicians, etc. for positioning, monitoring, and/or maintenance purposes. To that end, vehicles 102 also communicate with a wireless communications tower 108 via, for example, a wireless cell modem (not shown) installed in sensor units 104. Vehicles 102 may communicate (via wireless communications tower 108) sensor data, location data, diagnostic data, etc. to relevant entities interconnected via a network 110 (e.g., the Internet). The relevant entities include a data center(s) 112 and a cloud storage provider 114. Communications between vehicles 102 and data center(s) 112 allow the autonomous vehicles to be piloted and/or monitored. Cloud storage provider 114 provides storage for data generated by sensor units 104, the data being potentially useful for modeling and/or other purposes.

Data center(s) 112 include(s) servers 116 utilized for communicating with vehicles 102. Servers 116 also include (or are at least connected to) at least one vehicle dynamics service 118. Vehicle dynamics service 118 utilizes autonomous vehicle training data to generate models for estimating dynamic variables of an autonomous vehicle from certain inputs. In an example embodiment, a generated model utilizes the steering angle command and the linear velocity of the vehicle to generate an estimate for the yaw rate of the vehicle. The generated model is provided to other vehicles that are sufficiently similar to the test vehicle. The generated model can then be utilized by the other vehicles to provide real-time estimates of the yaw rates of the vehicles.

Figure 2:
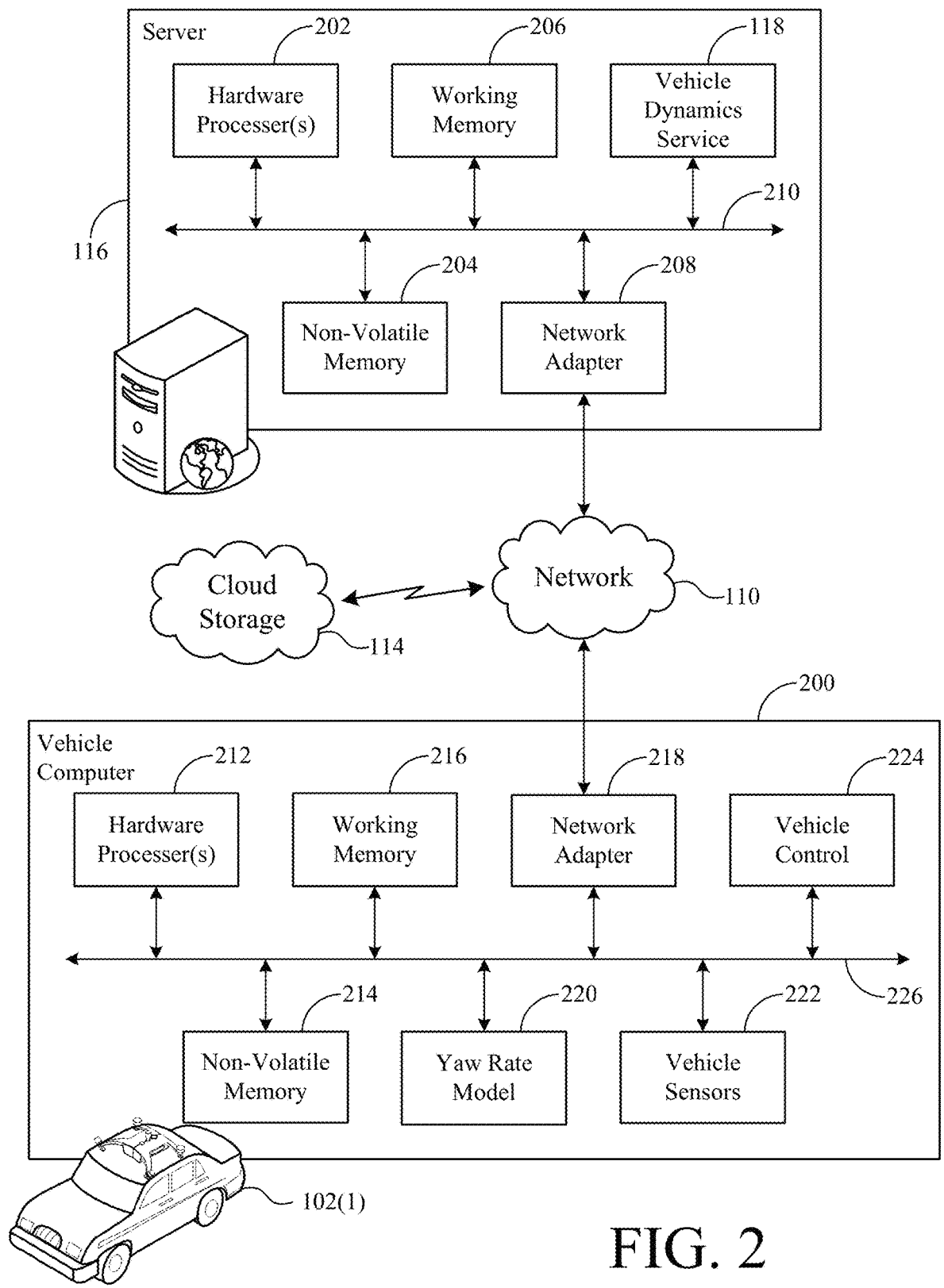
FIG. 2 is a block diagram showing one of the vehicles and one of the servers of FIG. 1 in additional detail.

FIG. 2 is a block diagram showing an example one of servers 116 and a vehicle computer 200 in greater detail. Server 116 includes at least one hardware processor 202, non-volatile memory 204, working memory 206, a network adapter 208, and vehicle dynamics service 118, all interconnected and communicating via a system bus 210. Hardware processor 202 imparts functionality to server 116 by executing code stored in any or all of non-volatile memory 204, working memory 206, and vehicle dynamics service 118. Hardware processor 202 is electrically coupled to execute a set of native instructions configured to cause hardware processor 202 to perform a corresponding set of operations when executed. In the example embodiment, the native instructions are embodied in machine code that can be read directly by hardware processor 202. Software and/or firmware utilized by server 116 include(s) various subsets of the native instructions configured to perform specific tasks related to the functionality of server 116. Developers of the software and firmware write code in a human-readable format, which is translated into a machine-readable format (e.g., machine code) by a suitable compiler.

Non-volatile memory 204 stores long term data and code including, but not limited to, software, files, databases, applications, etc. Non-volatile memory 204 can include several different storage devices and types, including, but not limited to, hard disk drives, solid state drives, read-only memory (ROM), etc. distributed across data center 112. Hardware processor 202 transfers code from non-volatile memory 204 into working memory 206 and executes the code to impart functionality to various components of server 116. For example, working memory 206 stores code, such as software modules, that when executed provides the described functionality of server 116. Working memory 206 can include several different storage devices and types, including, but not limited to, random-access memory (RAM), non-volatile RAM, flash memory, etc. Network adapter 208 provides server 116 with access (either directly or via a local network) to network 110. Network adapter 208 allows server 116 to communicate with cloud storage 114, vehicles 102 and sensor units 104 (via vehicle computer 200), and others.

Vehicle dynamics service 118 includes software, hardware, and/or firmware configured for generating, training, and/or running models for estimating vehicle dynamics from vehicle state and control inputs. Service 118 utilizes processing power, data, storage, etc. from hardware processor 202, non-volatile memory 204, working memory 206, and network adapter 208 to facilitate the functionality of service 118. For example, service 118 may access vehicle data stored in non-volatile memory 204 in order to train a model from the data. Service 118 may then store data corresponding to the trained model back in non-volatile memory 204 in a separate format, separate location, separate directory, etc. The details of vehicle dynamics service 118 will be discussed in greater detail below.

Vehicle computer 200 includes at least one hardware processor 212, non-volatile memory 214, working memory 216, a network adapter 218, a yaw rate model 220, vehicle sensors 222, and vehicle controls 224, all interconnected and communicating via a system bus 226. Hardware processor 212 imparts functionality to computer 200 by executing code stored in any or all of non-volatile memory 214, working memory 216, and yaw rate model 220. Hardware processor 212 is electrically coupled to execute a set of native instructions configured to cause hardware processor 212 to perform a corresponding set of operations when executed. In the example embodiment, the native instructions are embodied in machine code that can be read directly by hardware processor 212. Software and/or firmware utilized by computer 200 include(s) various subsets of the native instructions configured to perform specific tasks related to the functionality of vehicle computer 200. Developers of the software and firmware write code in a human-readable format, which is translated into a machine-readable format (e.g., machine code) by a suitable compiler.

Non-volatile memory 214 stores long term data and code including, but not limited to, software, files, databases, applications, etc. Non-volatile memory 214 can include several different storage devices and types, including, but not limited to, hard disk drives, solid state drives, read-only memory (ROM), etc. Hardware processor 212 transfers code from non-volatile memory 214 into working memory 216 and executes the code to impart functionality to various components of computer 200. For example, working memory 216 stores code, such as software modules, that when executed provides the described functionality of vehicle computer 200. Working memory 216 can include several different storage devices and types, including, but not limited to, random-access memory (RAM), non-volatile RAM, flash memory, etc. Network adapter 218 provides computer 220 with access (either directly or via a local network) to network 110. Network adapter 218 allows computer 220 to communicate with cloud storage 114 (via network 110), server 116, and others.

Vehicle sensors 222 include a variety of sensors and other instruments for determining information indicative of the state and surroundings of vehicle 102(1). Sensors 222 may include, but are not limited to, cameras, light detection and ranging (LiDAR) sensors, GPS units, accelerometers, inertial measurement units, thermometers, speedometers, or any other sensor that may provide potentially useful information regarding the state or the surroundings of vehicle 102(1). In the example embodiment, sensors 222 include sensors for detecting the velocity of vehicle 102(1) and the steering angle of the steering tires of vehicle 102(1). These sensors provide inputs to yaw rate model 220, which are utilized to estimate the yaw rate of vehicle 102(1) during operation.

Vehicle controls 224 include a variety of control systems for providing control instructions to various systems of vehicle 102(1). Controls 224 may include, but are not limited to, steering controls, braking controls, powertrain controls, signaling controls, or any other controls that may be useful in piloting vehicle 102(1). In the example embodiment, controls 224 include a steering control for providing control signals to the steering components of vehicle 102(1). These steering control signals are also utilized as inputs to yaw rate model 220 for estimating the yaw rate of vehicle 102(1) during operation. Vehicle sensors 222 and vehicle controls 224 will be discussed in further detail with reference to FIG. 3B below.

Figures 3A, 3B:
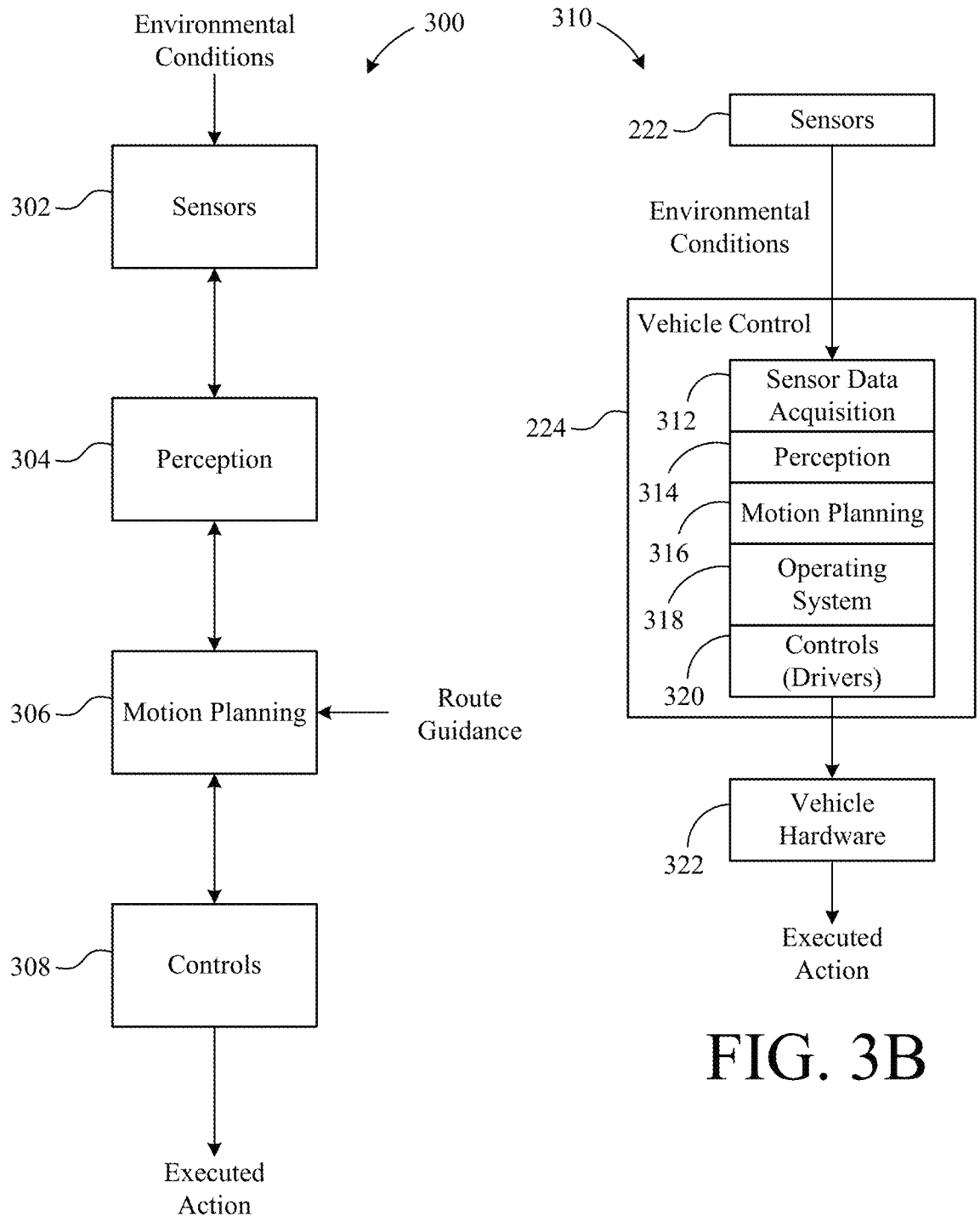
FIG. 3A is a flow chart summarizing an example method, which can be implemented by an autonomous driving stack, which is utilized to pilot the vehicles of FIG. 1.
FIG. 3B is a block diagram showing an example autonomous driving stack.

FIG. 3A is a flow chart summarizing an example method 300 of determining what commands to provide to an autonomous vehicle during operation. In a first step 302, sensors capture data representative of the environment of the vehicle. Then, in a second step 304, the sensor data is analyzed to form perceptions corresponding to the environmental conditions. Next, in a third step 306, the environmental perceptions (in conjunction with route guidance) are used to plan desirable motion. Then, in a fourth step 308, the planned motion(s) is/are used to generate control signals, which result in the desired motion.

FIG. 3B is a block diagram showing an example autonomous driving (AD) stack 310, which is utilized by autonomous vehicle 102 to determine what commands to provide to the controls of the vehicle (e.g., implementing method 300). Primarily, AD stack 310 is responsible for dynamic collision and obstacle avoidance. AD stack 310 is at least partially instantiated within vehicle computer 200 and utilizes information that may or may not originate elsewhere. AD stack 310 receives input from sensors 222 and includes a sensor data acquisition layer 312, a perception layer 314, motion planning layer 316, an optional operating system layer 318, and a control/driver layer 320.

AD stack 310 receives input from sensors 222 and provides control signals to vehicle hardware 322. Sensors 222 gather information about the environment surrounding vehicle 102 and/or the dynamics of vehicle 102, and provide that information in the form of data to a sensor data acquisition layer 312. Sensors 222 can include, but are not limited to, cameras, Light Detecting and Ranging (LiDAR) detectors, accelerometers, GPS modules, and any other suitable sensor including those yet to be invented. Perception layer 314 analyzes the sensor data to make determinations about what is happening on and in the vicinity of vehicle 102 (i.e. the "state" of vehicle 102), including localization of vehicle 102. For example, perception layer 314 can utilize data from LiDAR detectors, cameras, etc. to determine that there are people, other vehicles, sign posts, etc. in the area surrounding the vehicle, and that the vehicle is in a particular location. It should be noted that there isn't necessarily a clear division between the functions of sensor data acquisition layer 312 and perception layer 314. For example, LiDAR detectors of sensors 302 can record LiDAR data and provide the raw data directly to perception module 304, which performs processing on the data to determine that portions of the LiDAR data represent nearby objects. Alternatively, the LiDAR sensor itself could perform some portion of the processing in order to lessen the burden on perception module 304.

Perception layer 314 provides information regarding the state of vehicle 102 to motion planning layer 316, which utilizes the state information along with received route guidance to generate a plan for safely maneuvering vehicle 102 along a route. Motion planning layer 316 utilizes the state information to safely plan maneuvers consistent with the route guidance. For example, if vehicle 102 is approaching an intersection at which it should turn, motion planning layer 316 may determine from the state information that vehicle 102 needs to decelerate, change lanes, and wait for a pedestrian to cross the street before completing the turn.

In the example, the received route guidance can include directions along a predetermined route, instructions to stay within a predefined distance of a particular location, instructions to stay within a predefined region, or any other suitable information to inform the maneuvering of vehicle 102. The route guidance may be received from data center 112 over a wireless data connection, input directly into the computer of vehicle 102 by a passenger, generated by the vehicle computer from predefined settings/instructions, or obtained through any other suitable process.

Motion planning layer 316 provides the motion plan, optionally through an operating system layer 318, to control/drivers layer 320, which converts the motion plan into a set of control instructions that are provided to the vehicle hardware 322 to execute the motion plan. In the above example, control layer 320 will generate instructions to the braking system of vehicle 102 to cause the deceleration, to the steering system to cause the lane change and turn, and to the powertrain to cause acceleration out of the turn. The control instructions are generated based on models (e.g. yaw rate model 220) that map the possible control inputs to the vehicle's systems onto the resulting dynamics. Again, in the above example, control module 308 utilizes yaw rate model 220 to determine the amount of steering required to safely move vehicle 102 between lanes, around a turn, etc. Control layer 320 must also determine how inputs to one system will require changes to inputs for other systems. For example, when accelerating around a turn, the amount of steering required will be affected by the amount of acceleration applied.

Yaw rate model 220 provides improvements to motion planning, controls, localization, and vehicle state estimation algorithms running in the respective modules of AD stack 310. Model 220 provides a better, more robust solution for motion planning layer 316 to compute feasible target trajectories for the vehicle to follow. Model 220 also provides for an improved tracking solution for control layer 320 by allowing for optimization over a finite time horizon to meet target yaw rate. Additionally, model 220 provides improvement to the output of the estimated states through use by the localization algorithm in the propagation step of the filter.

Although AD stack 310 is described herein as a linear process, in which each step of the process is completed sequentially, in practice the modules of AD stack 310 are interconnected and constantly operating. For example, sensors 222 are always receiving, and sensor data acquisition layer is always processing new information as the environment changes. Perception layer 314 is always utilizing the new information to detect object movements, new objects, new/changing road conditions, etc. The perceived changes are utilized by motion planning layer 316, optionally along with data received directly from sensors 222 and/or sensor data acquisition layer 312, to continually update the planned movement of vehicle 102. Control layer 320 constantly evaluates the planned movements and makes changes to the control instructions provided to the various systems of vehicle 102 according to the changes to the motion plan.

As an illustrative example, AD stack 310 must immediately respond to potentially dangerous circumstances, such as a person entering the roadway ahead of vehicle 102. In such a circumstance, sensors 222 would receive input indicative of an object in the peripheral area of vehicle 102 and provide the data to sensor data acquisition layer 312. In response, perception layer 314 could determine that the object is a person traveling from the peripheral area of vehicle 102 toward the area immediately in front of vehicle 102. Motion planning layer 316 would then determine that vehicle 102 must stop in order to avoid a collision with the person. Finally, control layer 320 would determine that aggressive braking is required to stop and provide control instructions to the braking system to execute the required braking. All of this must happen in relatively short periods of time in order to enable AD stack 310 to override previously planned actions in response to emergency conditions.

Figure 4:
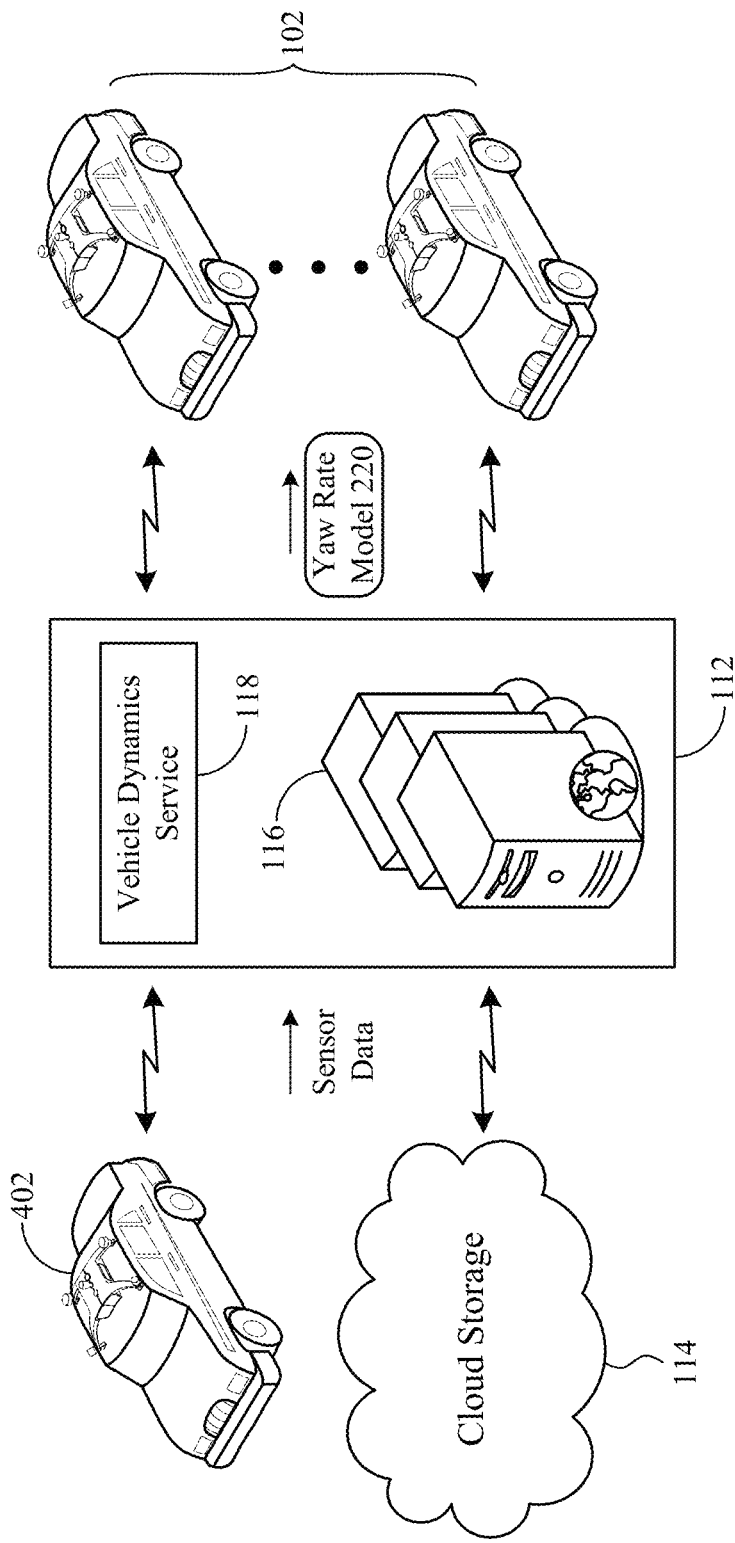
FIG. 4 is a block diagram showing an example process for training a yaw rate model for use in the vehicle computer of FIG. 3.

FIG. 4 is a diagram illustrating a process for generating yaw rate model 220 and providing the model for use by autonomous vehicles 102. A test vehicle 402 is piloted in order to produce sensor data that is utilized to generate yaw rate model 220. The sensor data comprises a chassis vehicle state estimation benchmark that is created using test vehicle 402, which is instrumented with a high precision GPS/IMU to identify the modeled system. The modeled system is then used in other vehicles along with a cheaper, less precise IMU for improved yaw rate estimation in the target vehicles. Test vehicle 402 provides the sensor data to servers 116 to be utilized by vehicle dynamics service 118. The sensor data includes, for example, timestamped control instructions to the steering system of the vehicle, timestamped measurements of the steering angle, timestamped measurements of the longitudinal velocity of the vehicle, and timestamped measurements of the yaw rate of the vehicle. Alternatively, sensor data recorded during prior voyages of other vehicles can be retrieved from cloud storage 114. In other examples, the immediate source of the sensor data can be any reliable source. It is preferred that the data is recorded during the piloting of a known test vehicle, whether it be vehicle 402 or some other vehicle having known or easily estimable characteristics (e.g., wheel base, center of gravity, weight, etc.).

The example model is based on data collected a priori, needs to be generated only once for a specific vehicle, and can be used widely, on the same range of vehicles safely. Preferably, test vehicle 402 is the same make, model, and year of vehicles 102, but this preference is not a strict necessity. However, in the example, the closer a vehicle's characteristics are to those of test vehicle 402, the more effective yaw rate model 220 will be for modeling the yaw rate of said vehicle. For example, if test vehicle 402 is a sedan and vehicles 102 are similar sedans, the yaw rate model will likely provide suitably accurate predictions. However, if test vehicle 402 and vehicles 102 are identical sedans, the yaw rate model will provide even more accurate predictions.

Vehicle dynamics service 118 obtains the sensor data and generates yaw rate model 220 from at least a portion of the data. In particular, vehicle dynamics service 118 determines how the yaw rate of vehicle 402 correlates with the commanded steering angle provided to the steering system. The resulting yaw rate model 220 is provided to vehicles 102 in order to predict the yaw rate that will result from a given steering angle command provided to the vehicles' steering systems. The computers 200 of vehicles 102 utilize yaw rate model 220 (in control layer 320, for example) to determine the proper steering angle commands to provide to the corresponding steering systems in order to perform desired maneuvers safely.

Figure 5:
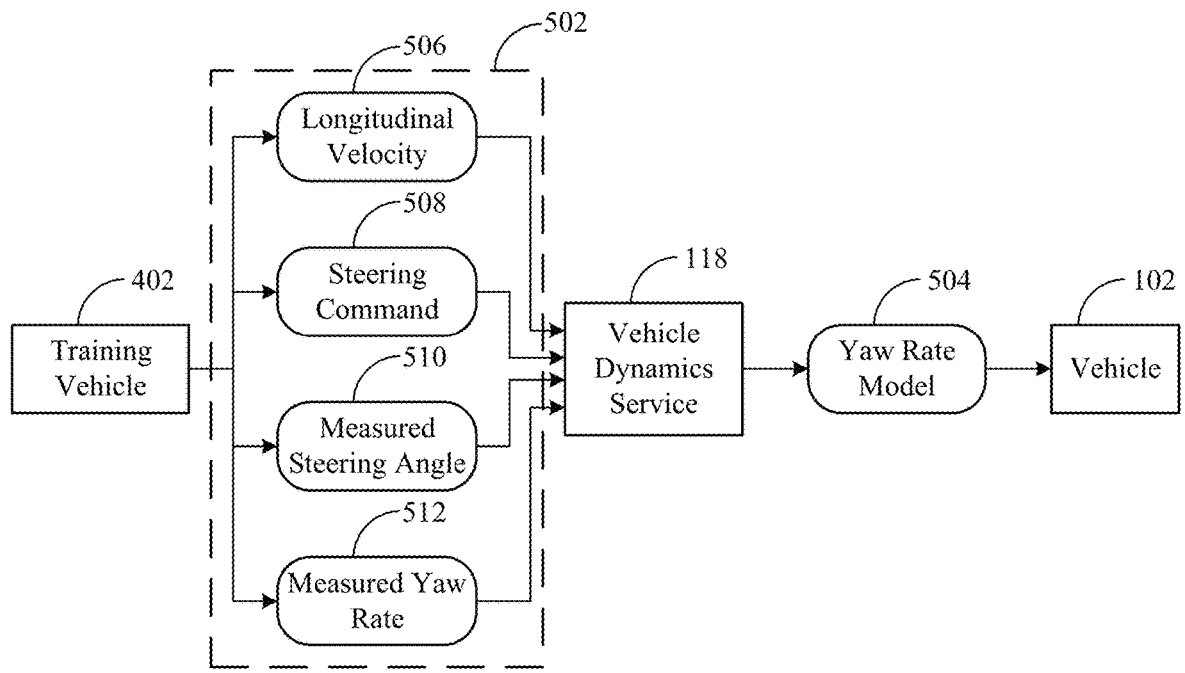
FIG. 5 is a block diagram showing data flow from a training data set to an example yaw rate model.

FIG. 5 is a block diagram showing data flow from training vehicle 402 to a vehicle 102. A training dataset 502 is utilized by vehicle dynamics service 118 to generate yaw rate model 220. Training dataset 502 includes, for example, timestamped longitudinal velocity measurements 506, timestamped steering command data 508, timestamped steering angle measurements 510, and timestamped yaw rate measurements 512. By comparing measurements 506, data 508, and measurements 510 and 512, vehicle dynamics service 118 models the yaw rate that will be generated by a particular steering angle command being executed by the vehicle's steering system at a given velocity. The generated model comprises yaw rate model 220, which is provided to vehicle(s) 102 utilized to predict the yaw rate of said vehicles given initial conditions and a steering input command.

Figure 6:
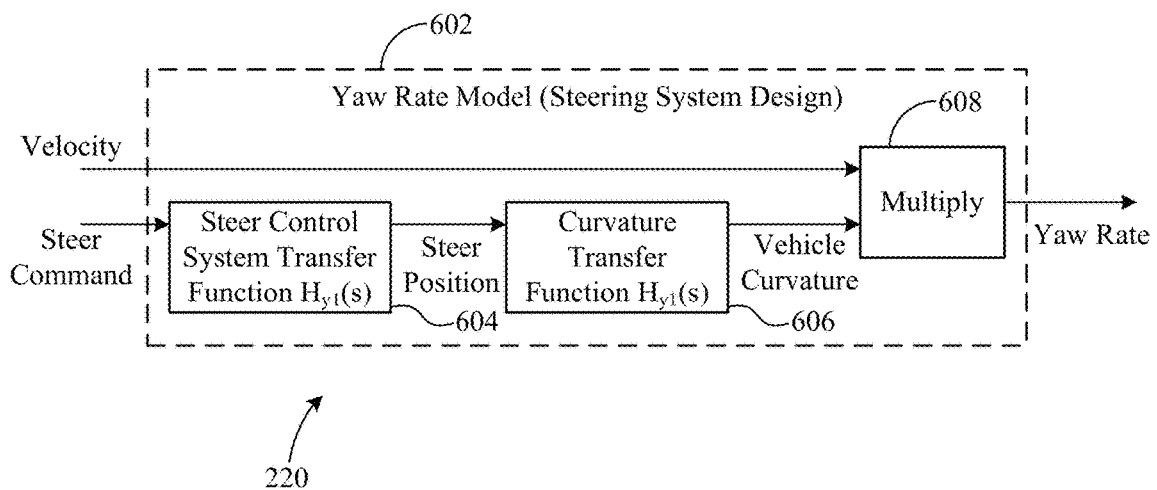
FIG. 6 is a block diagram showing the yaw rate model of FIG. 5 in further detail.

FIG. 6 is a block diagram showing yaw rate model 220 in greater detail. Yaw rate model 220 includes a steering system design module 602, which includes a steer control system transfer function 604 ($H_{y1}(s)$) and a curvature transfer function 606 ($H_{y2}(s)$). In general, a transfer function relates the inputs to the outputs of a particular system in a time-independent domain. Thus, for a given set of inputs a transfer function will always give the same outputs. In the example, the transfer function calculation procedure is split into two parts: first, estimating a steering position from a steering position command using transfer function 604, and second, estimating vehicle curvature from the estimated steering position using transfer function 606. However, in alternate embodiments, these two parts may be combined to estimate vehicle curvature from a steering position command, by utilizing a combined transfer function.

Based on the data recorded from AD stack 310 running on a real vehicle, vehicle dynamics service 118 identifies transfer functions that can map the desired outputs from the corresponding inputs as closely as possible, with the minimum order required for generating a reasonable correspondence between the real vehicle measured states and the output predicted by the transfer functions. Thus, the goal remains to find a transfer function from real vehicle data using system identification, which can be used to convert the input steering angle to the effective vehicle yaw rate. In the example, the input to the transfer functions is the control command output generated from AD stack 310 and the output from yaw rate model 220 is the estimated yaw rate of the vehicle.

It is often important to predict the yaw rate achieved by the vehicle based on the control inputs provided to it. Transfer function 604 captures the dynamics added by the steering wheel position controller by converting the steering angle command input to a steering angle output. Transfer function 606 converts a steering angle input (equal to the steering angle output of transfer function 604) to a vehicle curvature output. In other words, transfer function 604 determines the steering angle of vehicle 102 that results from a given steering command, and transfer function 606 determines the vehicle curvature that results from the steering angle determined by transfer function 604. In the example embodiment, the steering angle command is input as an angle equal to the steering angle desired at the steering tires of the vehicle. In alternative embodiments, the steering angle command could be an electrical signal provided to an actuator coupled to the steering system of the vehicle. Said electrical signal would then correspond to a desired steering angle of the steering tires, the exact correspondence depending on the design of the vehicle's steering and control systems. In such an embodiment, it is expected that the derived transfer function will implicitly model this correspondence without the need for explicitly modeling the relationship between the electrical signal and the desired steering angle.

Transfer functions 604 and 606 are determined from training data 502 and the kinematic relationship between the yaw rate ($\dot{\psi}$), longitudinal vehicle velocity ($v_x$), and the instantaneous radius of curvature (R):

$$\dot{\psi} = \frac{v_x}{R}$$

Yaw rate is measured in radians per second (rad/s), radius of curvature is measured in meters (m), and longitudinal velocity is measured in meters per second (m/s). Alternatively:

$$\dot{\psi} = \kappa v_x$$

Curvature ($\kappa$) is equivalent to 1/R. In the example, it is assumed that the steering angle will only affect the curvature component of the yaw rate without having a direct impact on the longitudinal velocity. Thus:

$$\kappa = f(\delta)$$

In other words, curvature is a function of the steering wheel angle at the road surface ($\delta$).

A multiplication module 608 multiplies the vehicle curvature by the longitudinal velocity to determine the yaw rate as an output of yaw rate model 504. Thus, yaw rate model 504 can take a velocity and a steering command as inputs and output an estimated yaw rate. In other words, yaw rate model 504 models a linear, time-invariant, multiple-in, single-out (MISO) system. This model provides a unique advantage by relying on the relationship between particular inputs and outputs of the system rather than a detailed parameterization of the vehicle (e.g. bicycle model, tire model, etc.), as used by kinematic/dynamic models for yaw rate prediction. Thus, specific knowledge of the internal dynamics of the vehicle/system are not required in the example in order to predict the yaw rate. Such knowledge includes, for example, length from vehicle center of gravity (CoG) to front axle, length from vehicle CoG to rear axle, cornering stiffness of front tire, cornering stiffness of rear tire, wheel base length, yaw moment of inertia of the vehicle, and others including those yet to be identified.

Yaw rate model 504 is similar to models generated by modern data driven approaches such as artificial neural networks (ANNs), which use data taken from observational test runs of the vehicles in question to generate extremely non-linear, but highly accurate estimations of vehicle parameters or models of the vehicles. These approaches are successful, but still considered to be "black boxes" (i.e. they have underlying models that are difficult to understand and, therefore, are difficult to verify and validate). Also, to generate these models non-trivial amounts of data are required from test runs that may not be available. This may be due to the fact that the vehicle itself is still in development and can't be physically driven, or because the user group does not have the resources to generate the large datasets required to train the models. Yaw rate model 504 leverages a basic kinematic model to find a middle ground between tire/bicycle models and data driven approaches.

New learned driving algorithms need simulator environments that can recreate realistic vehicle plant characteristics so that the driving policies learned in the simulator environment can be easier to transfer to the real vehicle. Assuming that the ANN methods for yaw rate estimation referred above can predict the yaw rate of the vehicle to similar or better accuracy, there is still the need to run a forward pass every time there is a need to compute the vehicle plant state as a result of the actuation command. Training the learned driving algorithms involve many training epochs each, and having a large neural network predicting the yaw rate is much slower than using transfer functions to develop a finite state space equation to predict the yaw rate more accurately. The finite space equation will improve efficiency as compared to forward passes of neural networks predicting the yaw rate as part of simulation vehicle plant computation.

In order to generate transfer functions 604 and 606, the values of the input and output values are modeled as factors of time. From the training data shown at least in FIGS. 7A-7F, curves can be fit to the measured data to identify functions of the relevant variables with respect to time. The transfer functions are then defined as the ratio of the Laplace transform of the output function to the Laplace transform of the input function. In an example embodiment, the first transfer function is equivalent to the Laplace transform of the measured steering angle as a function of time divided by the Laplace transform of the commanded steering angle as a function of time.

Transfer functions 604 and 606 are utilized to calculate an output state from an input given an initial state (e.g., the state of the system immediately prior to receiving the input). In an example embodiment, the zero state response to the input (i.e., the response of the system to the input assuming an initial state of zero) is calculated. In addition, the zero impulse response to the current state (i.e., the response of the system to the initial state, assuming an input of zero) is calculated. The complete response, or the output (which varies with time) of the system, is the superposition, or sum, of the zero state response and the zero impulse response. Each time a new input is received (e.g., AD stack 310 updates the steering command), the zero state response to the new input is calculated, along with the zero impulse response to the prior state of the system, in order to estimate the output state of the system. The calculation of the output states of a generic system given the input states and relevant transfer functions is known to those of ordinary skill in the art.

FIGS. 7A-7F show example training data from a residential test run. It is utilized to generate an example yaw rate model. The example training data includes a comparison between the measured yaw rate and the measured steering angle of an autonomous vehicle.

In the example, the data is specified for low speed autonomous vehicles with existing lateral acceleration limits that are used at the motion planning level and at controller safety limiting. These vehicles operate in a very controlled region of operation for most of the duration of operation. Specifically, the data is obtained for low speed operational design domains (ODDs) with speeds less than 30-35 mph and lateral acceleration less than 3 m/s². Thus, the maximum acceleration is well bounded and justified for the example analysis. In alternative examples, other data can be utilized to characterize vehicle operation for higher lateral accelerations for emergency situations like evasive and/or collision avoidance maneuvers.

The data shown in FIGS. 7A-7F is obtained from an example autonomous vehicle outfitted with a high precision GPS/inertial measurement unit (IMU). Ideally, all autonomous vehicles would have an aerospace grade, fully redundant high precision/high accuracy IMU and GPS solution that is capable of achieving signal accuracy of less than one percent marginal error. In reality, however, it is prohibitively costly to equip each and every autonomously driving vehicle with a high precision/high accuracy IMU and GPS solution. Therefore, the example embodiment utilizes a single high precision IMU and GPS solution in a test vehicle, in order to generate a low cost, effective methodology and framework to provide meaningful and applicable yaw rate measurements even for vehicles utilizing low cost IMU and GPS solutions. In the example, it is unnecessary to equip every single autonomously driving vehicle with a high precision IMU/GPS solution.

Figure 7A:
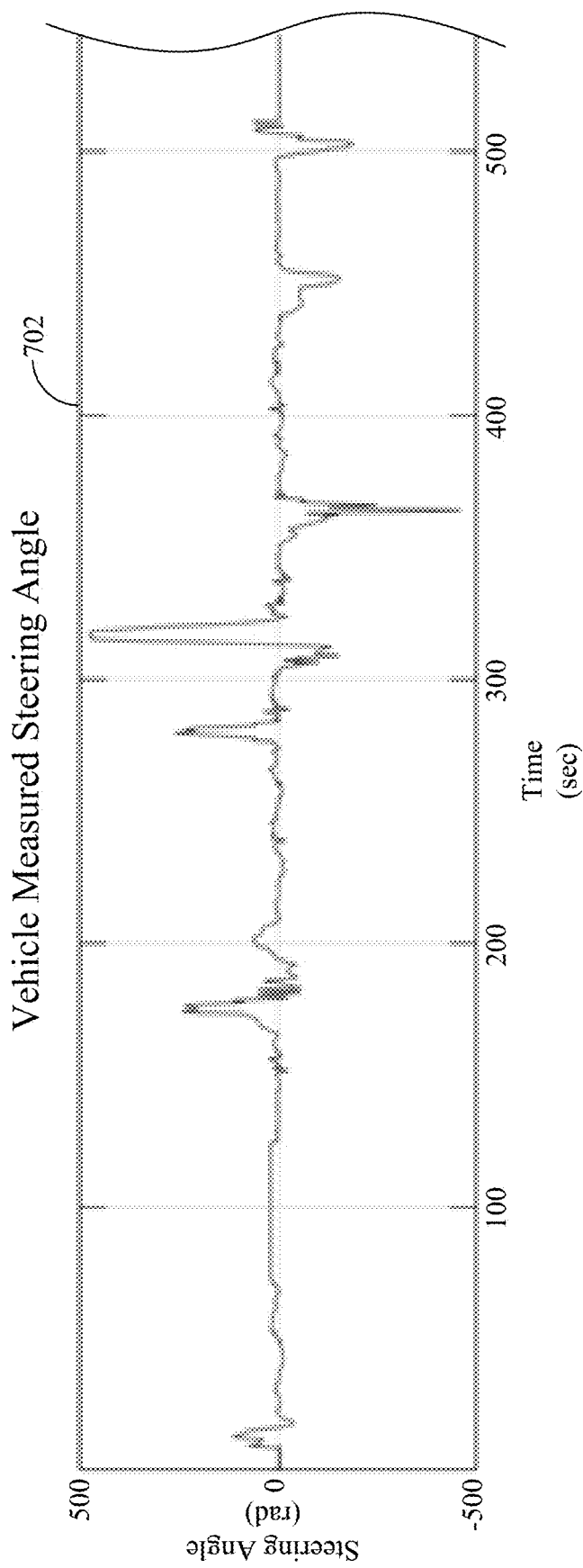
FIG. 7A is a first portion of a graph showing a measured steering angle of a training vehicle with respect to time.
Figure 7B:
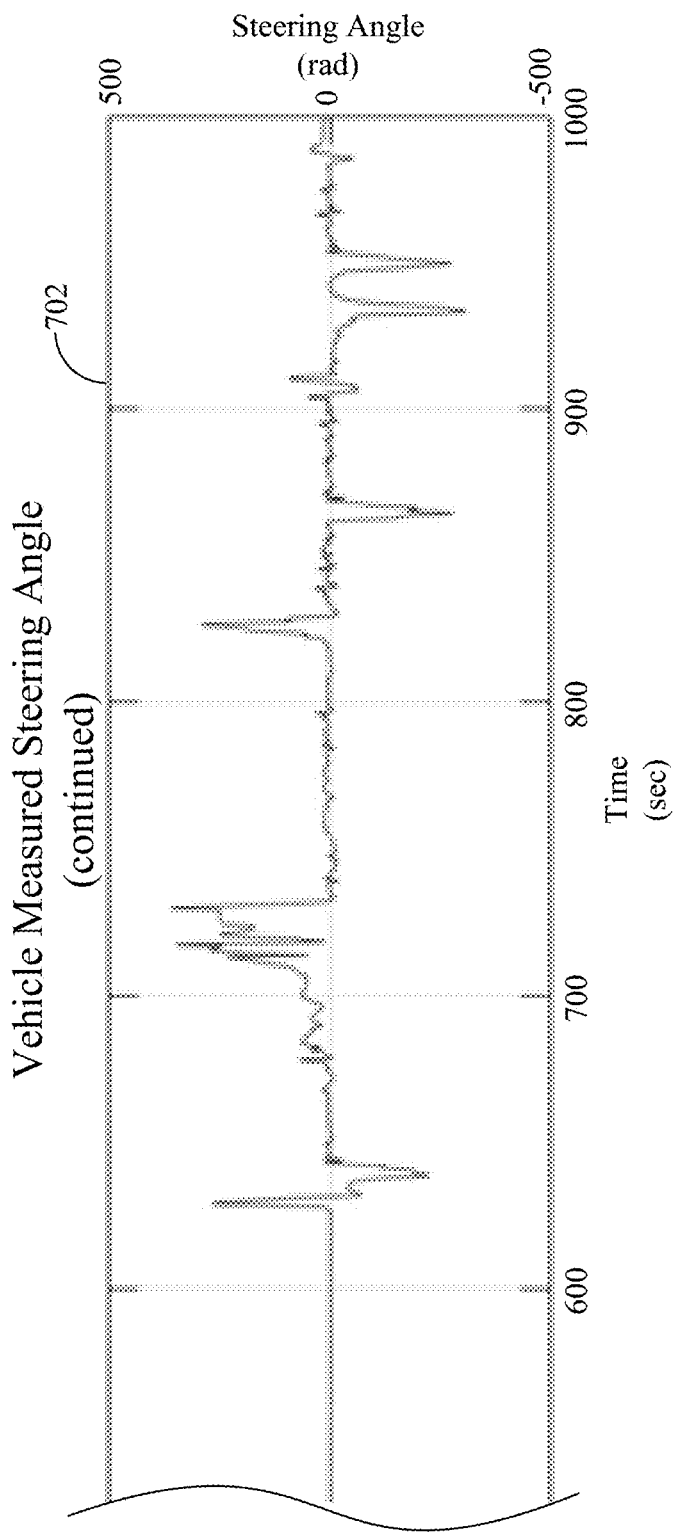
FIG. 7B is a second portion of the graph of FIG. 7A.

FIG. 7A includes a first portion a steering angle graph 702, while FIG. 7B includes a second portion of steering angle graph 702.

Figure 7C:
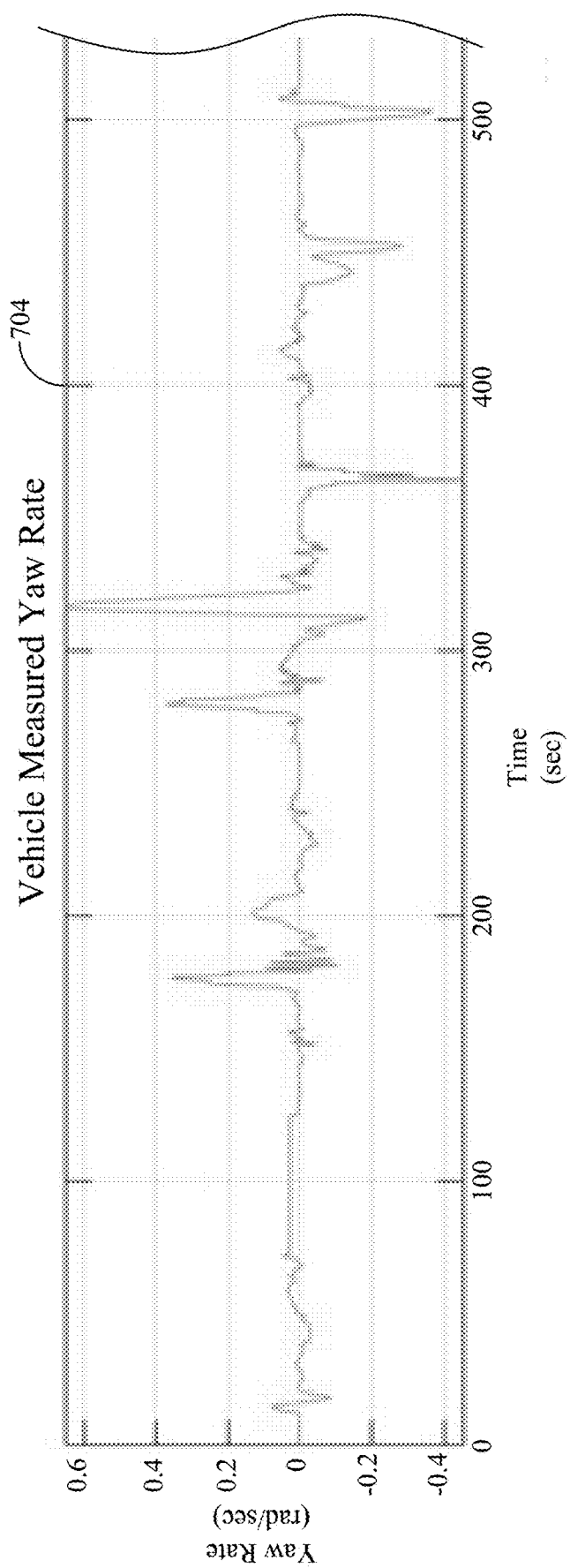
FIG. 7C is a first portion of a graph showing a measured yaw rate of a training vehicle with respect to time.
Figure 7D:
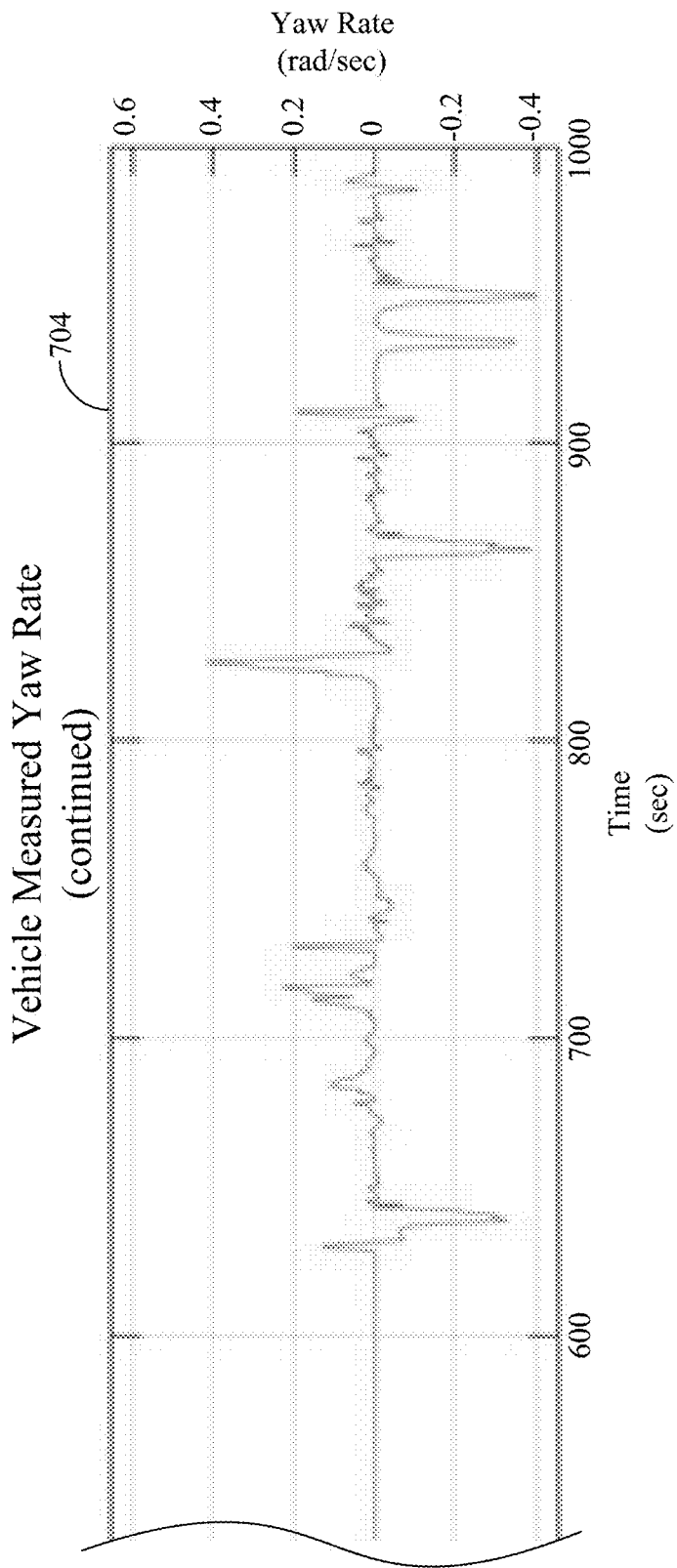
FIG. 7D is a second portion of the graph of FIG. 7C.

FIG. 7C includes a first portion of a yaw rate graph 704, while FIG. 7D includes a second portion of yaw rate graph 704.

Figure 7E:
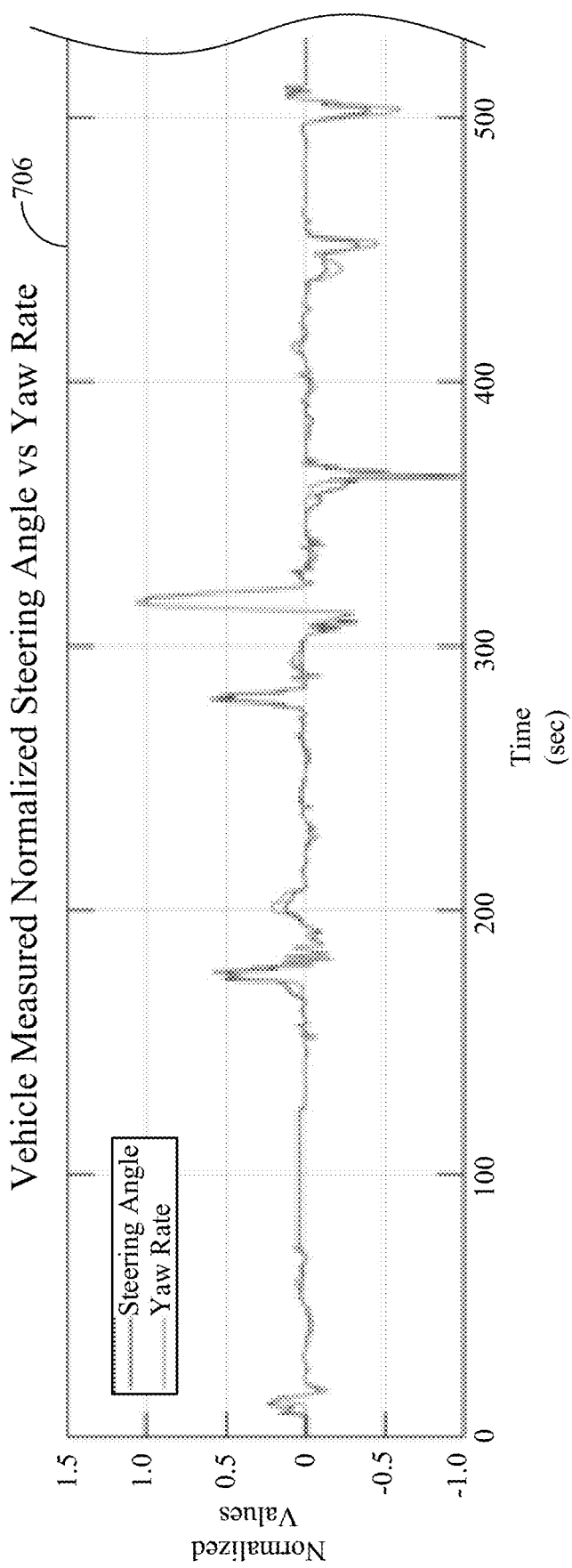
FIG. 7E is a first portion of a graph showing a comparison between the measured yaw rate of FIG. 7C and measured steering angle of FIG. 7A.
Figure 7F:
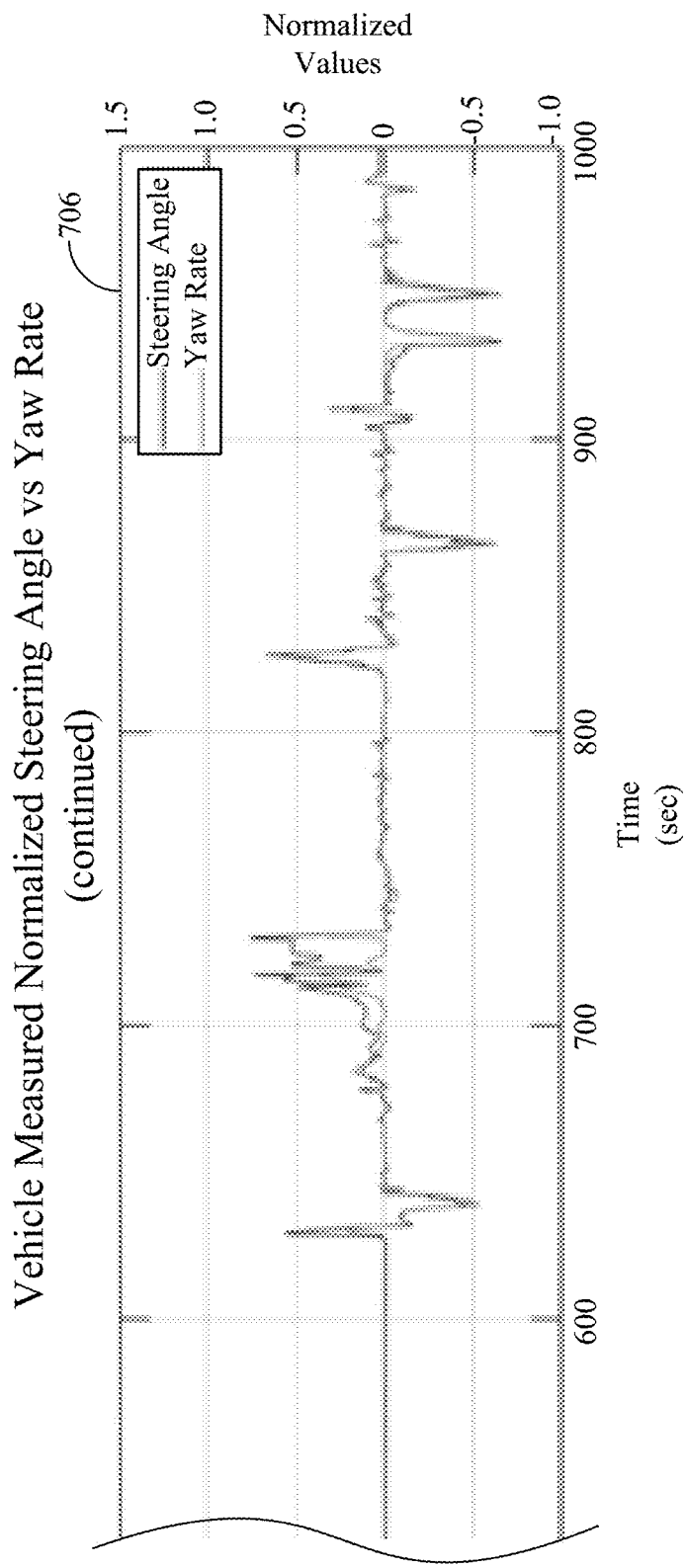
FIG. 7F is a second portion of the graph of FIG. 7E.

FIG. 7E includes a first portion of a comparison graph 706, while FIG. 7F includes a second portion of comparison graph 706.

Graph 702 shows the steering angle (measured at the road surface in radians) plotted against time (measured in seconds). Graph 704 shows the yaw rate (measured in radians/second) plotted against time (measured in seconds). Graph 706 shows a comparison between normalized values of the measured steering angle with normalized values of the measured yaw rate plotted against time.

The data shown in FIGS. 7A-7F is utilized in the second part of a two-part procedure for estimating transfer functions 604 and 606. Estimating transfer function 604, which describes the relationship between the commanded steering position and the measured (i.e. actual) steering position, is relatively easy, because typically the commanded and measured steering angles are a close match, thus producing an excellent fit. The transfer function estimated for $H_{y1}(s)$ is given below:

$$H_{y1}(s) = \frac{6.411}{s + 6.436}$$

The data required for estimating transfer function 606 is taken from the measured steering position that was logged and the curvature that is generated using the measured longitudinal velocity and the measured yaw rate according to the above kinematic relationship (i.e. $\dot{\psi} = \kappa v_x$). A section of data from t=77.5 s to t=90 s was selected to estimate transfer function 606. This section was selected due to the fact that the velocity in this section is roughly constant, and the yaw rate transition is smooth. The transfer function estimated for $H_{y1}(s)$ is given below:

$$H_{y2}(s) = \frac{124.378s + 502.733}{s^2 + 908.011s + 2682.9}$$

The combined transfer function $H_y(s)$ is shown given below:

$$H_y(s) = H_{y1}(s) \cdot H_{y2}(s) = \frac{797.4s + 3223}{s^3 + 914.4s^2 + 8527s + 17270}$$

The combined transfer function relates the steering command input to the vehicle curvature output. Strictly speaking, the combined transfer function is the ratio of the Laplace transforms of the steering command input as a function of time and the curvature output as a function of time.

Figure 8:
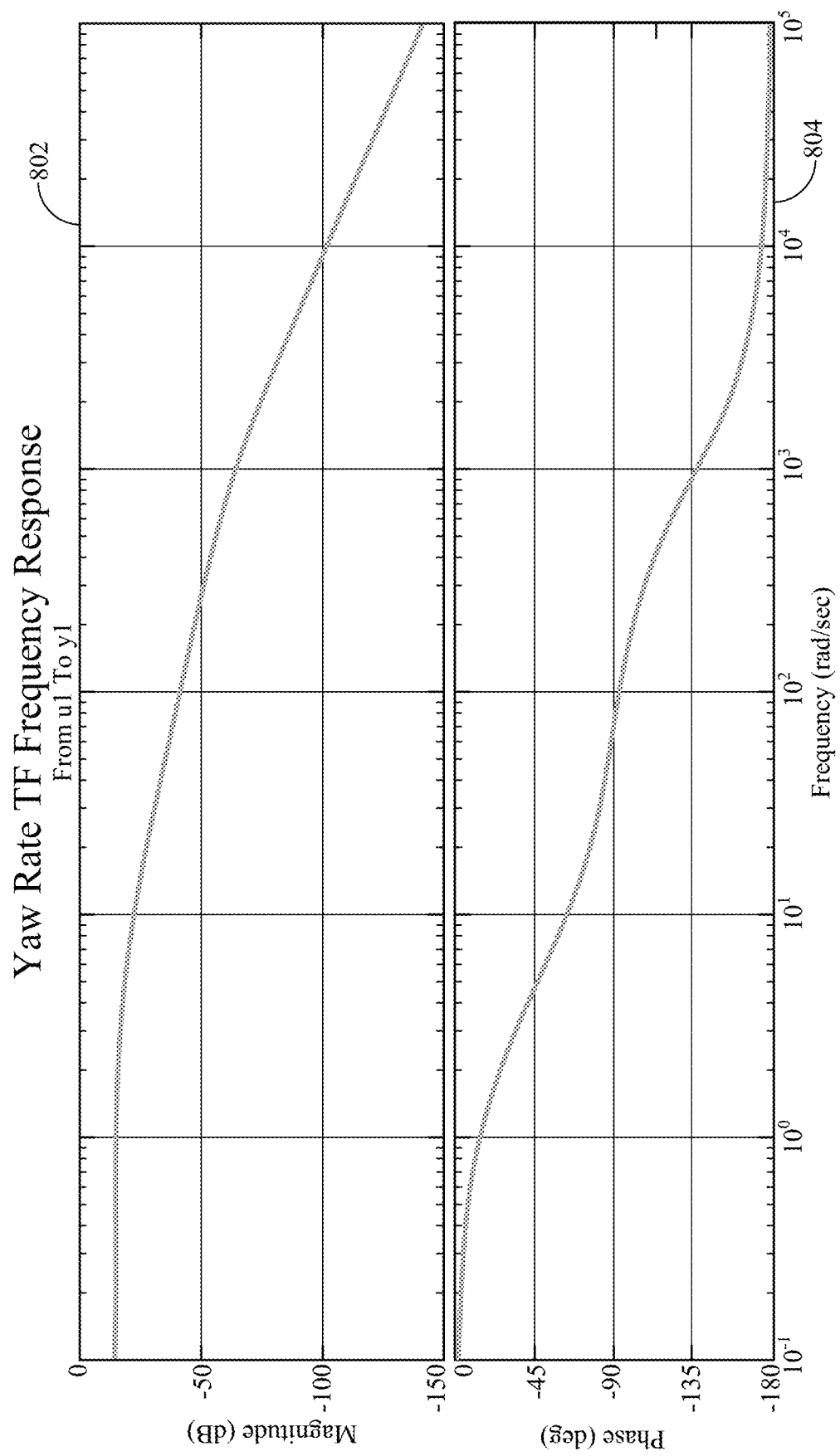
FIG. 8 is a graph showing the frequency response of the combined transfer functions of FIG. 6.

FIG. 8 shows the frequency response of the combined transfer functions 604 and 606. FIG. 8 includes a magnitude (measured in dB) graph 802 and a phase (measured in degrees) graph 804, both plotted against frequency (measured in radians per second). Graph 802 illustrates the frequency response of a stable example system that provides good command following, disturbance rejection, and sensitivity reduction.

Figure 9:
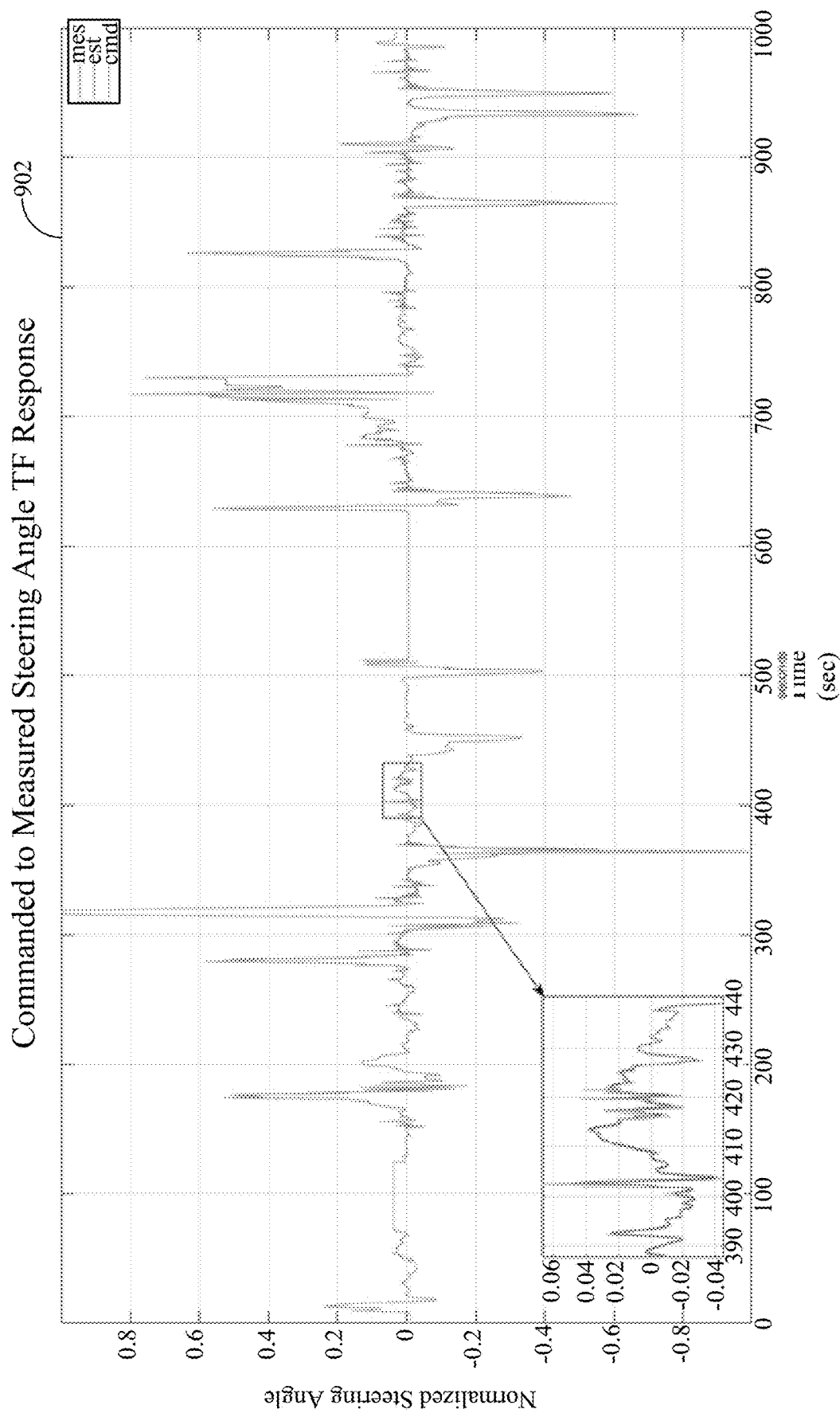
FIG. 9 is a graph showing a comparison between the commanded steering angle, the measured steering angle, and the steering angle of a vehicle as estimated by the first transfer function of FIG. 6.

FIG. 9 is a graph 902 showing a commanded to measured steering angle transfer function response generated using transfer function 604. Graph 902 includes the commanded steering angle, the measured steering angle, and the steering angle as estimated by first transfer function 604, all plotted against time. The commanded steering angle and measured steering angle data originate from training dataset 502, for example. The steering angle estimate data originate from applying transfer function 604 to the commanded steering angle data. As can be observed from FIG. 9, the fit is excellent.

Figure 10A:
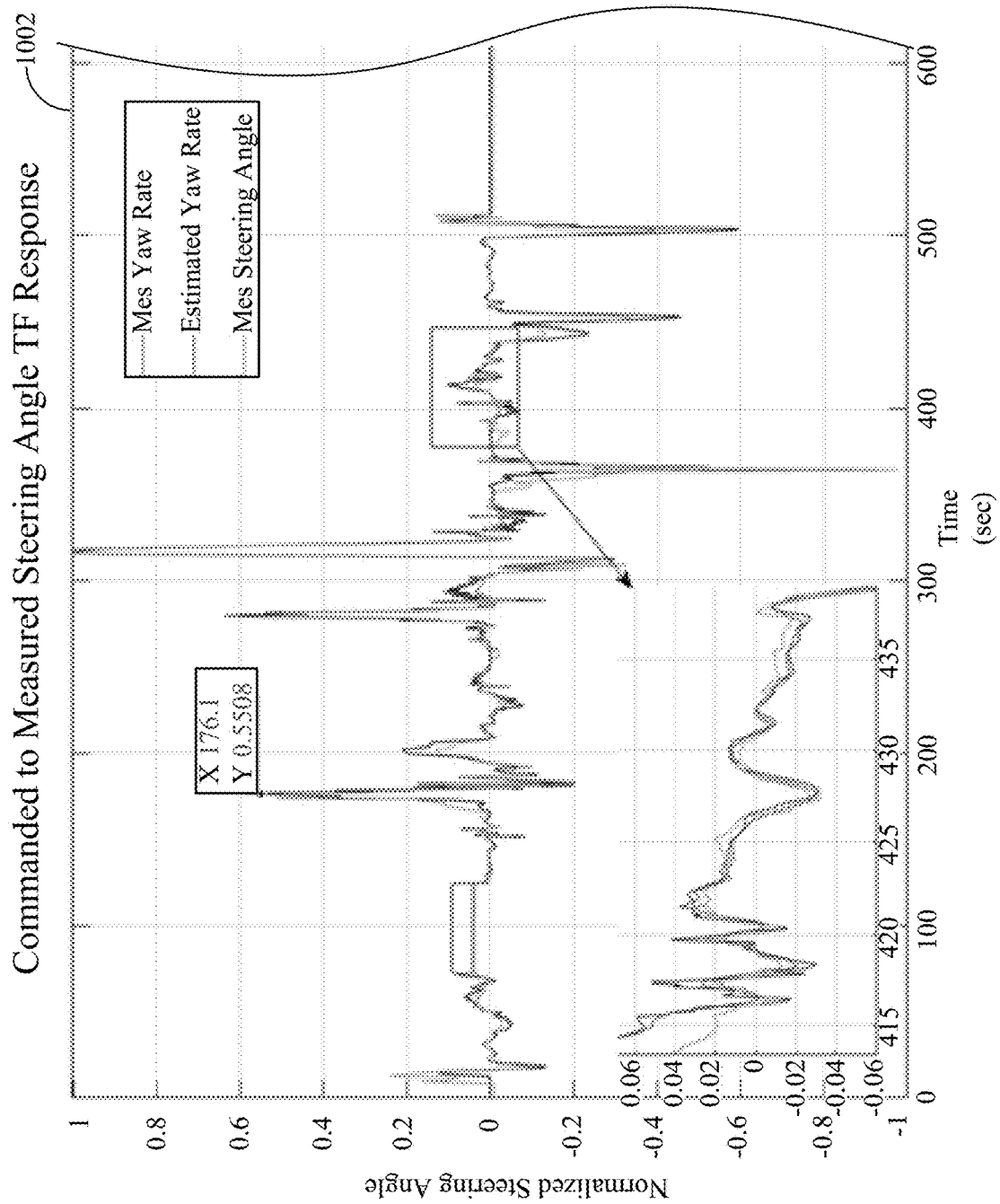
FIG. 10A is a first portion of a graph showing a comparison between the measured yaw rate, the measured steering angle, and the yaw rate of a vehicle as estimated by the second transfer function of FIG. 6.
Figure 10B:
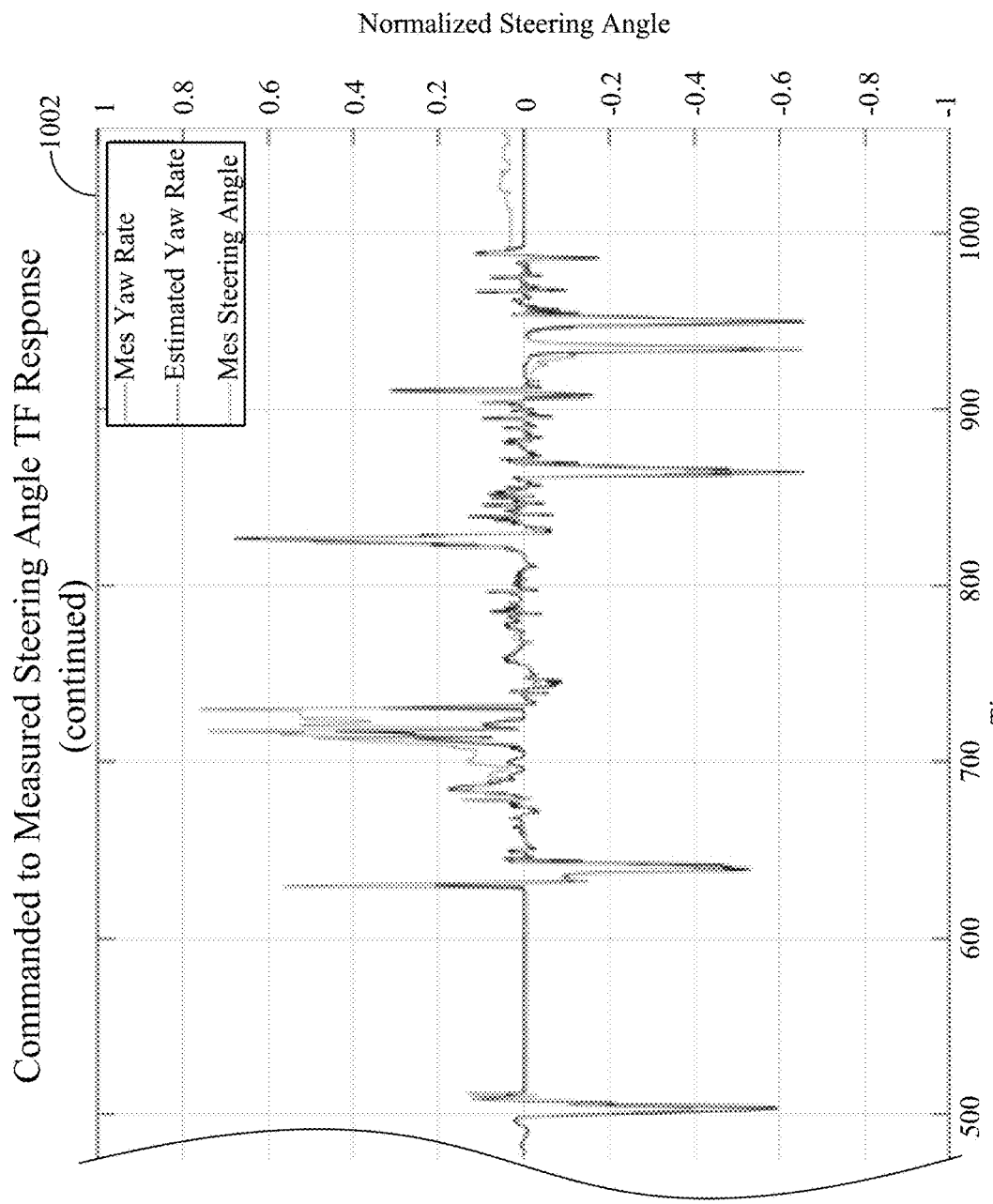
FIG. 10B is a second portion of the graph of FIG. 10A.

FIG. 10A shows a first portion of a graph 1002 showing a lateral yaw rate transfer function response generated using transfer function 606, while FIG. 10B shows a second portion of graph 1002. Graph 1002 includes the measured yaw rate, the measured steering angle, and the yaw rate as estimated by yaw rate model 222. The measured yaw rate and measured steering angle data originate from training dataset 502, for example. The yaw rate estimate data originate from applying transfer function 606 to the measured steering angle data. As can be observed from graph 1002, the fit to output is well approximated. Indeed, the overall root mean squared error (RMSE) for the estimated combined transfer function is 0.0082 rad/s over a recording length of 1080 s.

Figure 11A:
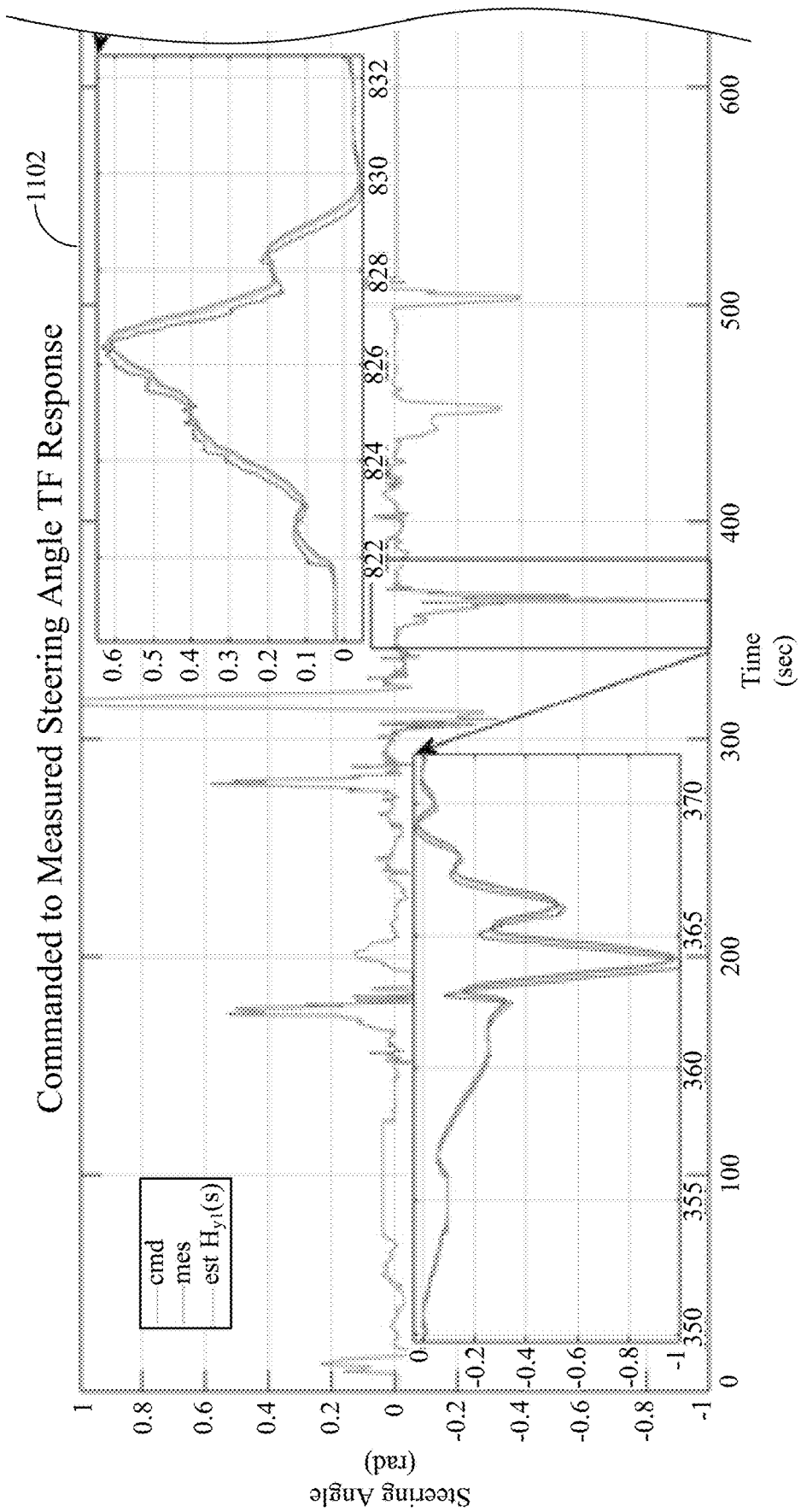
FIG. 11A is a first portion of a graph showing a comparison between the commanded steering angle, the measured steering angle, and the steering angle of a vehicle as estimated by the first transfer function of FIG. 6.
Figure 11B:
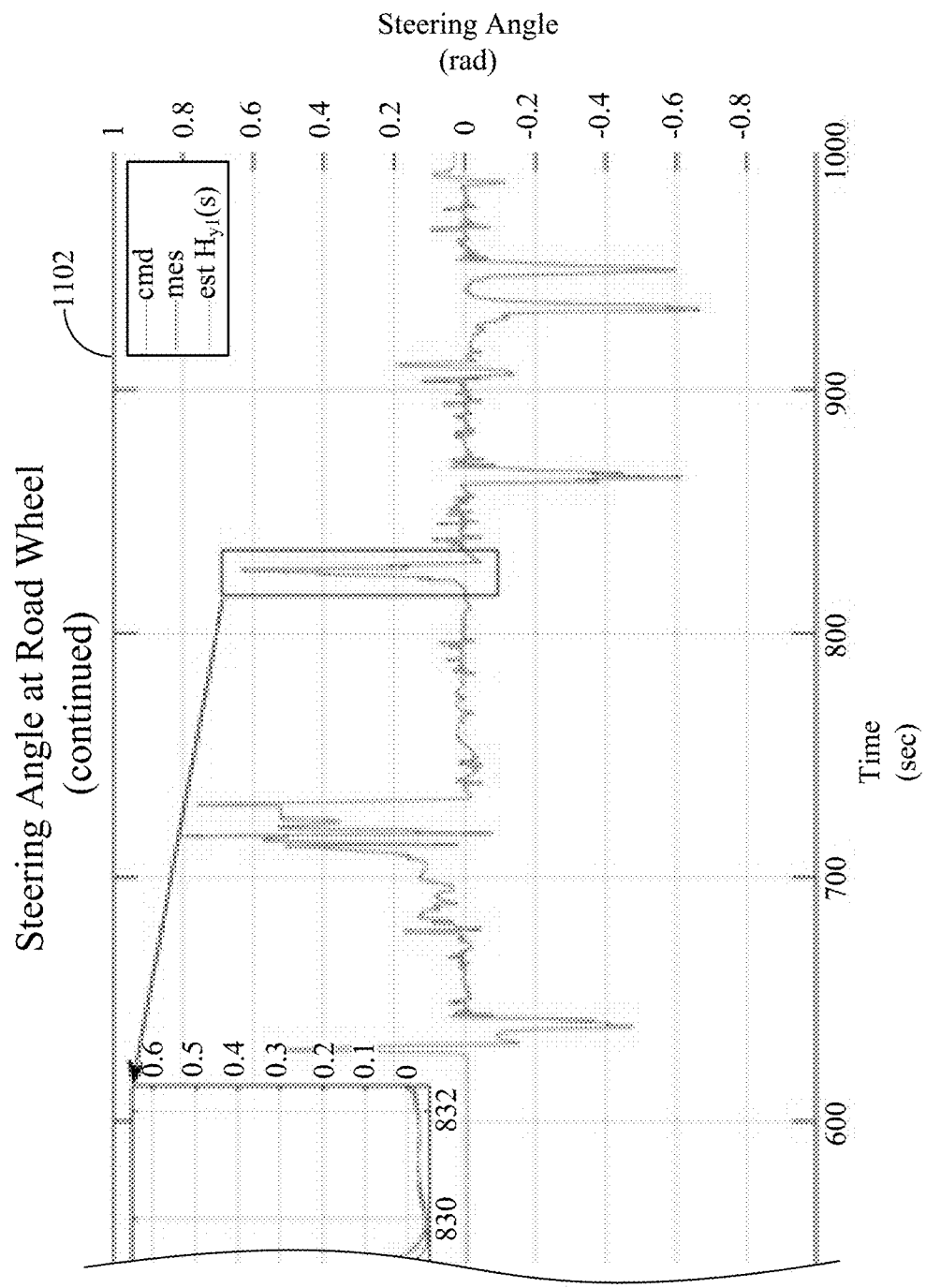
FIG. 11B is a second portion of the graph of FIG. 11A.

FIG. 11A shows a first portion of a graph 1102 showing a comparison between the commanded steering angle, the measured steering angle, and the steering angle as estimated by first transfer function 604, while FIG. 11B shows a second portion of graph 1102. Graph 1102 is similar to graph 902, but includes two insets, which show the fit in greater detail. The insets show two smaller time domains stretched along the x-axis. The first stretches from 350 s to approximately 372 s. The second stretches from approximately 820 s to 832 s. The insets show that the agreement between the measured steering angle and the estimated steering angle is well within a tenth of radian at any given point in time.

Figure 12A:
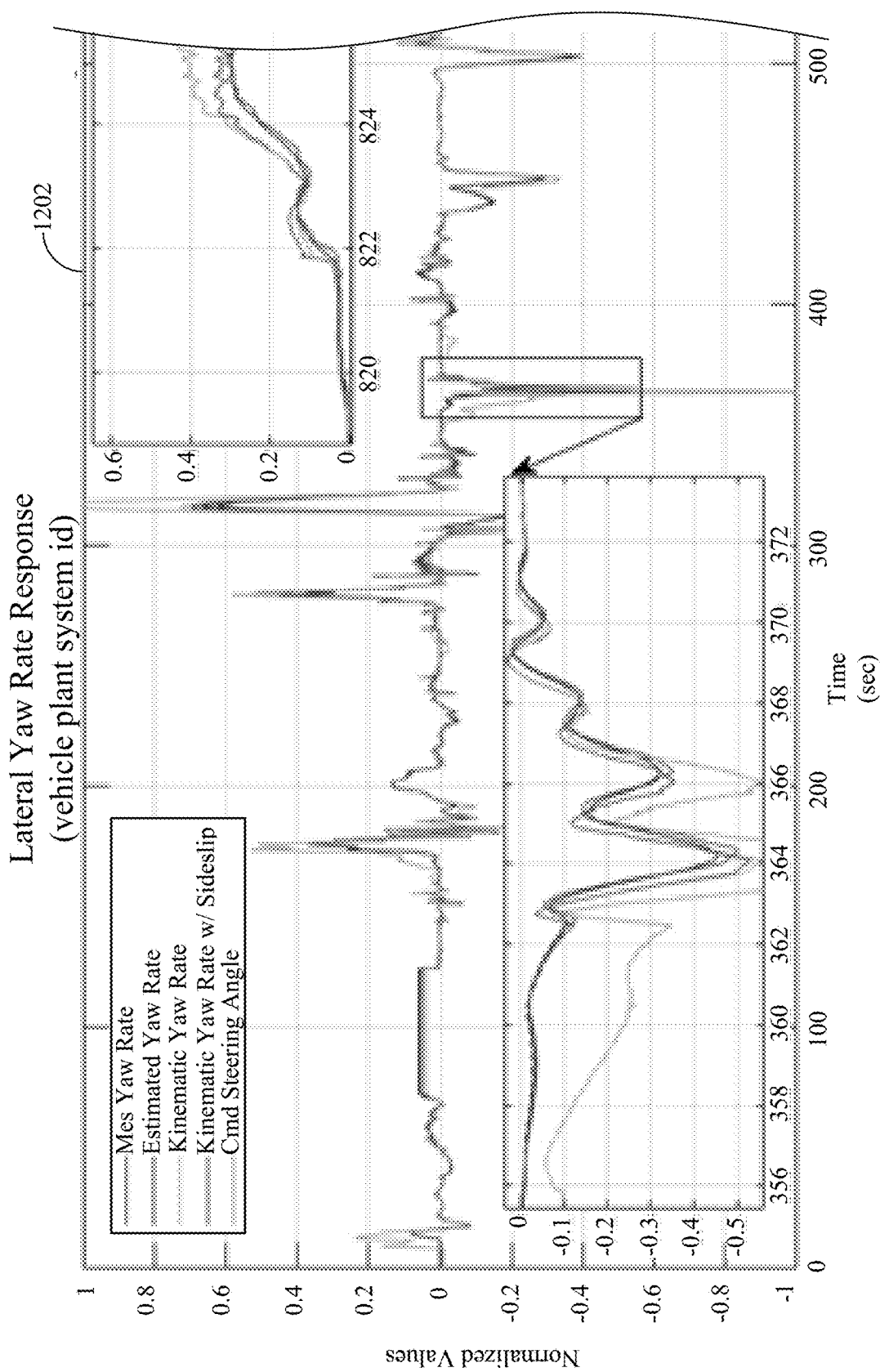
FIG. 12A is a first portion of a graph showing a comparison between the measured yaw rate, the commanded steering angle, the yaw rate as estimated by kinematic models, and the yaw rate as estimated by the yaw rate model of FIG. 6.
Figure 12B:
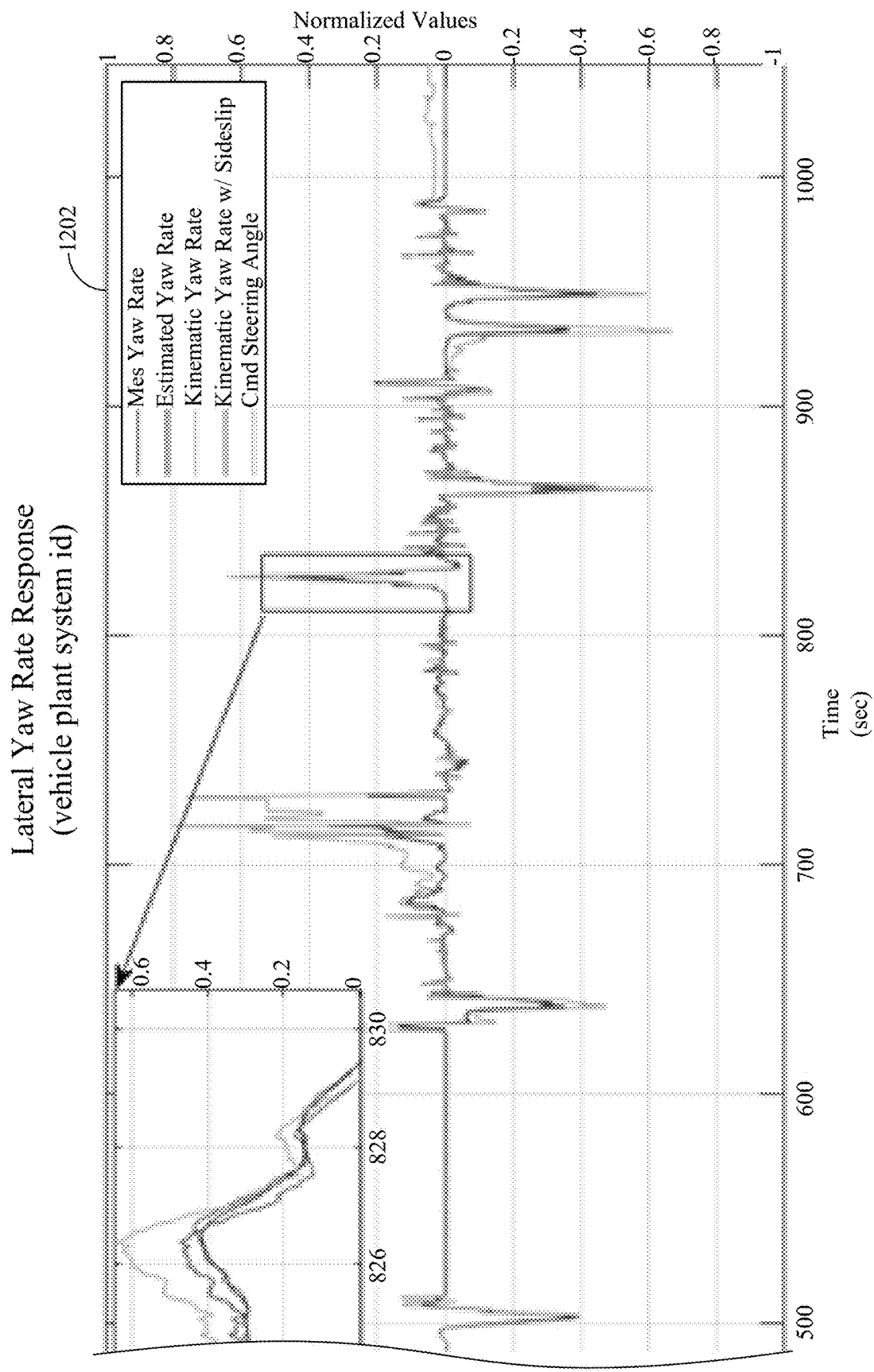
FIG. 12B is a second portion of the graph of FIG. 12A.

FIG. 12A shows a first portion of a graph 1202 showing a comparison between the measured yaw rate, the commanded steering angle, the yaw rate as estimated by a kinematic model, and the yaw rate as estimated by yaw rate model 220, where FIG. 12B shows a second portion of graph 1202. The measured yaw rate and commanded steering angle data originate from training dataset 502, for example.

Graph 1202 includes data indicative of the yaw rate as estimated by a kinematic model. The kinematic model includes both a basic kinematic model and a kinematic model factoring slip angle. The basic kinematic model is shown below:

$$\dot{\psi} = v_x * \tan(\delta)/L$$

Where,
 $\dot{\psi}$=yaw rate
 $v_x$=longitudinal velocity at CoG of vehicle
 $\delta$=steering wheel angle, measured at road surface
 $L=L_r+L_f$=wheelbase length (m), length from front to rear axle
Factoring the slip angle, the model becomes:

$$\dot{\psi} = v_x * \cos(\beta) * \tan(\delta)/L$$
$$\beta = \tan^{-1}\left(\tan(\delta) * \frac{L_r}{L}\right)$$

Where,
 $\beta$=slip angle, angle of velocity vector wrt vehicle heading angle at CoG
 $L_r$=length from CoG to rear axle From graph 1202, the RMSE of the yaw rate estimated by yaw rate model 220 is 0.0082 rad/s with respect to the measured yaw rate. The RMSE of the yaw rate estimated by the basic kinematic model is 0.0173 rad/s with respect to the measured yaw rate. Therefore, yaw rate model 220 produces a 52.60% reduction in error over the basic kinematic model. Similarly, the RMSE of the yaw rate estimated by the side slip kinematic model is 0.0167 rad/s with respect to the measured yaw rate. Therefore, yaw rate model 220 produces a 50.89% reduction in error over the side slip kinematic model.

Figure 13A:
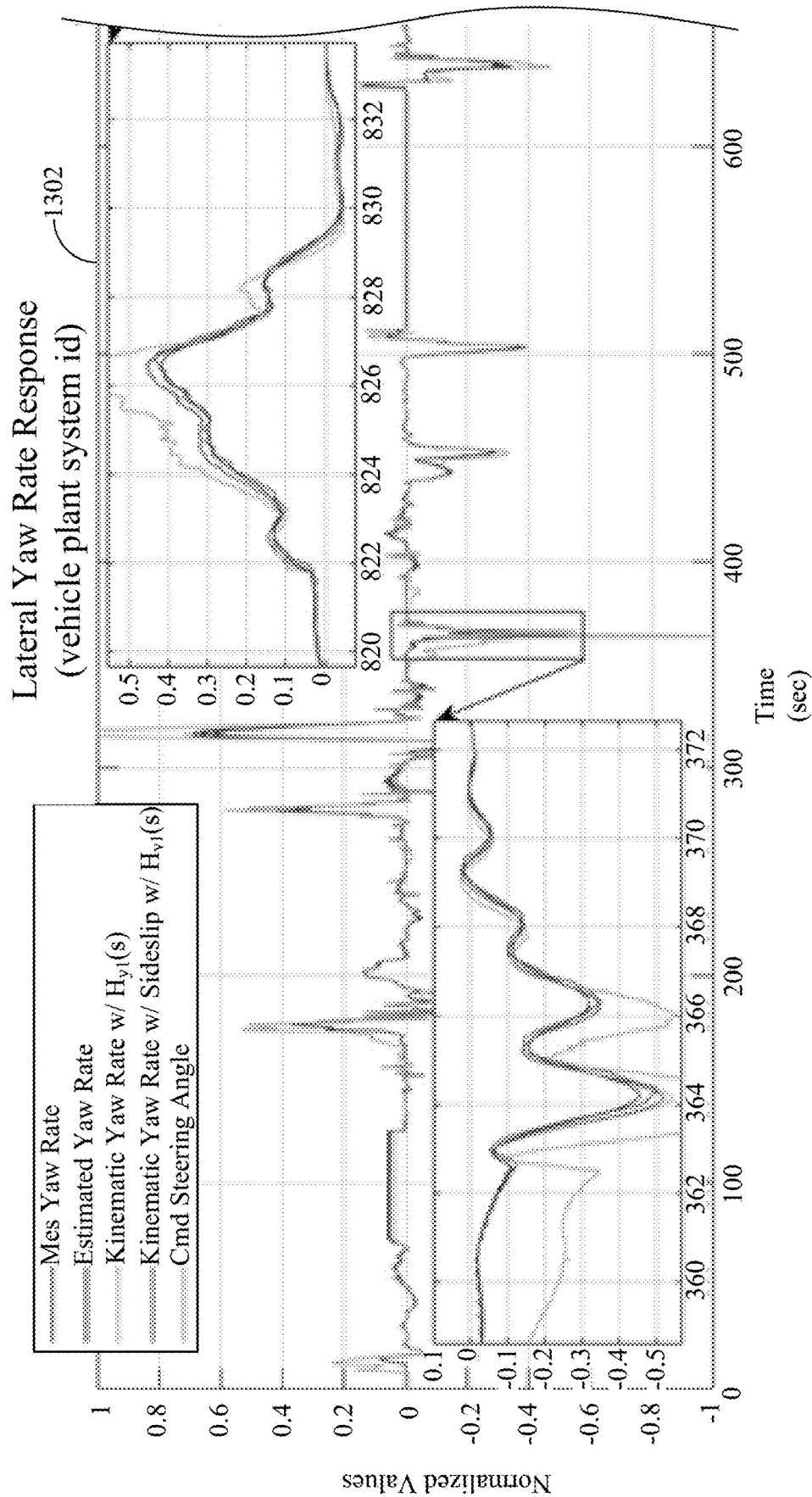
FIG. 13A is first portion of a graph showing a comparison between the measured yaw rate, the yaw rate as estimated by kinematic models as improved according to the steering transfer function of FIG. 6, the yaw rate as estimated by kinematic sideslip models as improved according to the steering transfer function of FIG. 6, the commanded steering angle, and the yaw rate as estimated by the yaw rate model of FIG. 6.
Figure 13B:
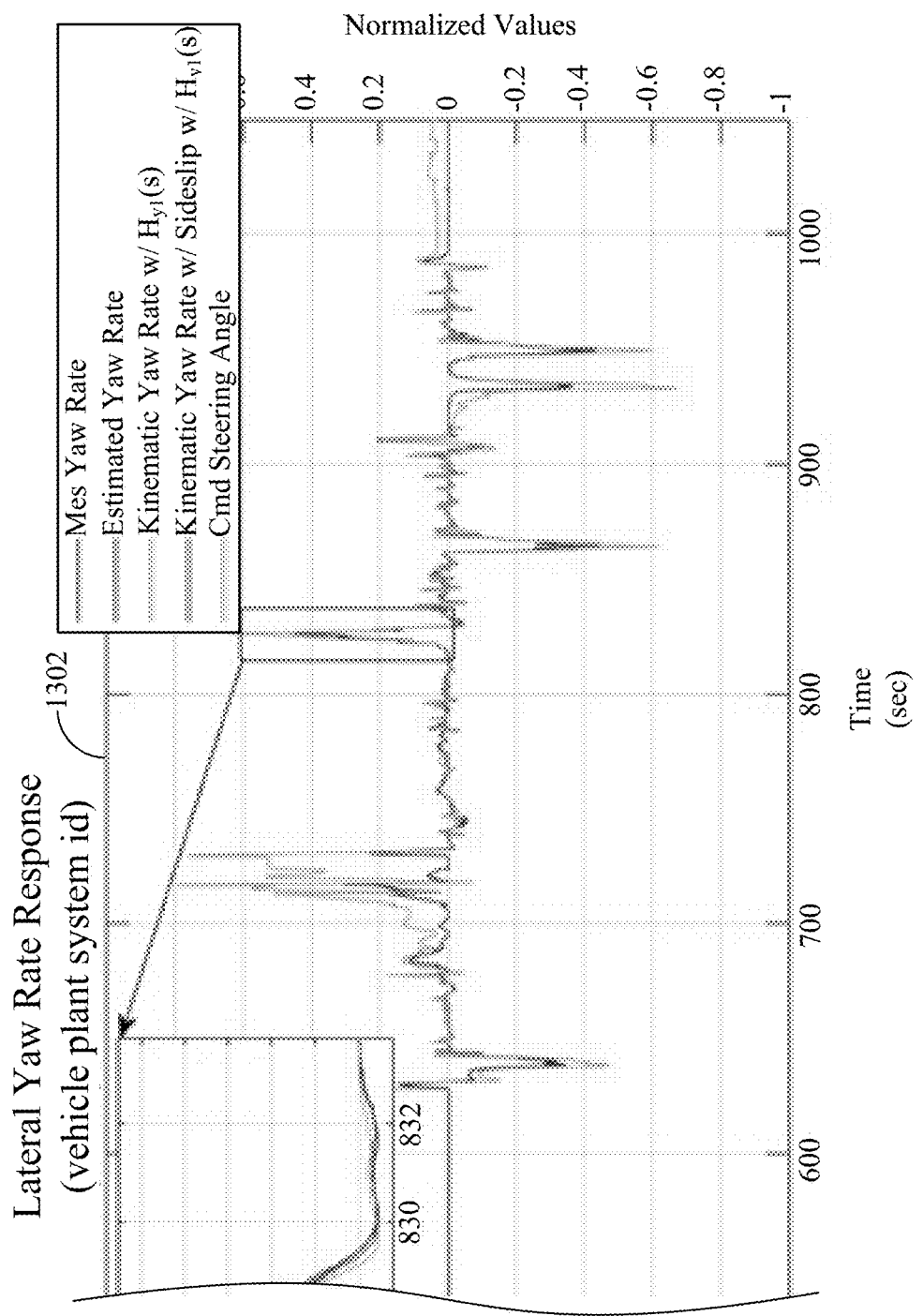
FIG. 13B is a second portion of the graph of FIG. 13A.

FIG. 13A shows a first portion of a graph 1302 showing a comparison between the measured yaw rate, the yaw rate estimated by yaw rate model 220, the yaw rate estimated by the kinematic model as improved according to transfer function 604, the yaw rate estimated by the slip angle kinematic model as improved according to transfer function 604, and the commanded steering angle. FIG. 13B shows a second portion of graph 1302. The measured yaw rate and the commanded steering angle data originate from training dataset 502, for example.

Graph 1302 illustrates the results obtained through the use of an alternate embodiment, in which transfer function 604 is utilized to estimate the steering angle from the commanded steering angle, and the estimated steering angle is utilized as the input to the kinematic models in order to estimate the yaw rate.

Utilizing transfer function 604 to estimate the steering angle before computing the kinematic yaw rate provides a significant improvement over not using transfer function 604. The RMSE of the yaw rate estimated by the kinematic model (as stated above) is 0.0173 rad/s. The RMSE of the yaw rate estimated by the kinematic model with the estimated steering input from transfer function 604 is 0.0103 rad/s. Therefore, utilizing the output from transfer function 604 as an input to the kinematic model produces a 40.46% reduction in error over the basic kinematic model alone. Similarly, the RMSE of the yaw rate estimated by the side slip kinematic model (as stated above) is 0.0167 rad/s, and the RMSE of the yaw rate estimated by the side slip kinematic model with the estimated steering input from transfer function 604 is 0.0095 rad/s. Therefore, utilizing the output from transfer function 604 as an input to the side slip kinematic model produces a 43.11% reduction in error over the side slip kinematic model alone.

The yaw rate estimated by utilizing the combined transfer function (as shown in FIG. 6) is still preferable to the estimates provided by the improved kinematic model. As stated above, the RMSE of the yaw rate estimated by combining transfer functions 604 and 606 is 0.0082 rad/s. Therefore, utilizing the combined transfer function to estimate the yaw rate produces a 20.83% reduction in error over the basic kinematic model with input from transfer function 604, and a 13.68% reduction in error over the side slip kinematic model with input from transfer function 604.

Figure 14:
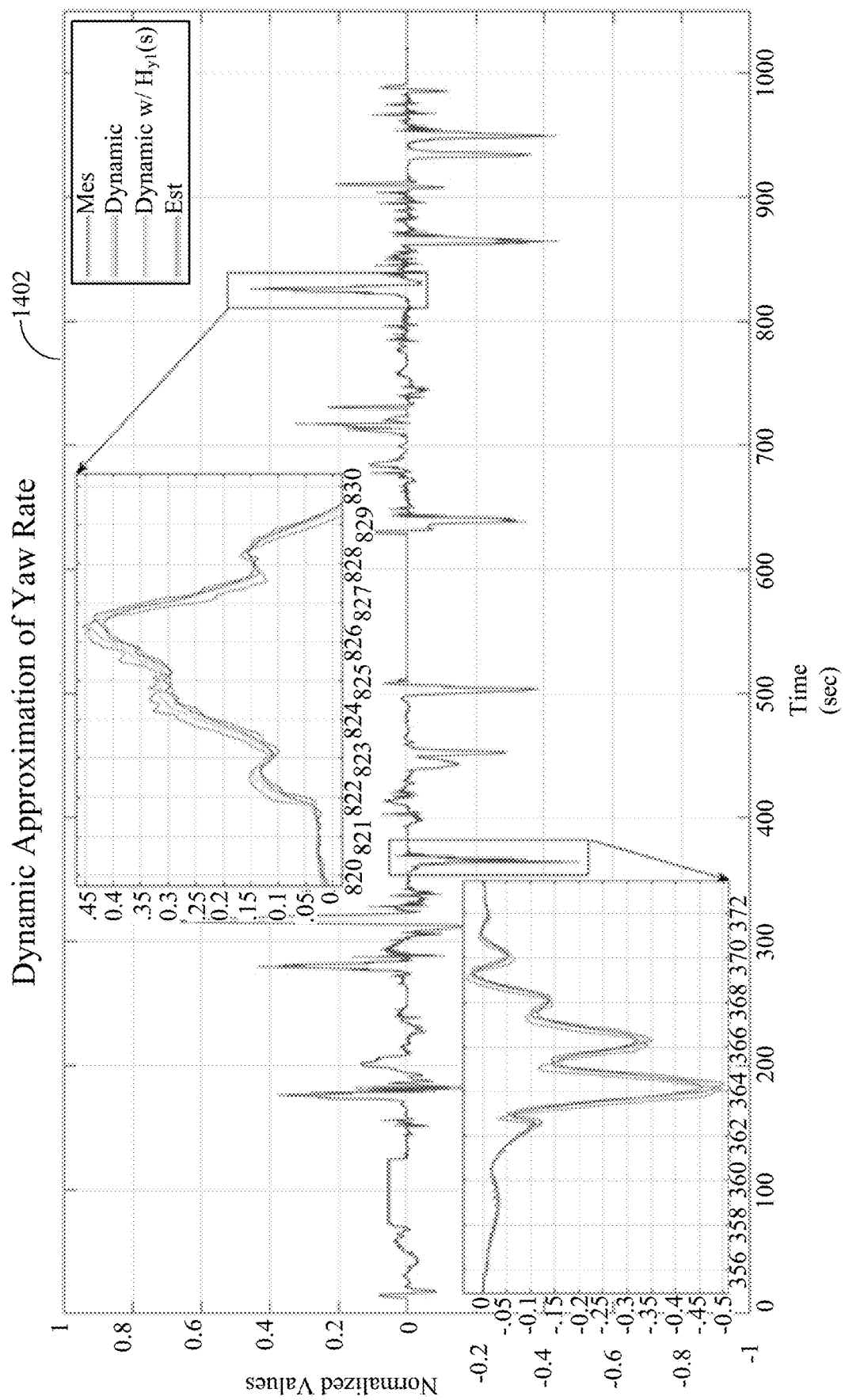
FIG. 14 is a graph showing a comparison between the measured yaw rate, the yaw rate estimated by a dynamic model, the yaw rate estimated by the dynamic model as improved according to the steering transfer function of FIG. 6, and the yaw rate estimated by the yaw rate model of FIG. 6.

FIG. 14 shows a graph 1402 showing a comparison between the measured yaw rate, the yaw rate as estimated by the dynamic model, the yaw rate as estimated by the dynamic model with the estimated steering input from transfer function 604, and the yaw rate as estimated by yaw rate model 220. The measured yaw rate data originate from training dataset 502, for example.

Graph 1402 includes data indicative of the yaw rate as estimated by a dynamic model. The dynamic model is a second order differential equation with linear assumptions. The dynamic model is shown below:

$$d\dot{\psi} = \frac{(-2L_f C_{\alpha f} + 2L_r C_{\alpha r})}{I_Z V_x} V_y + \frac{(-2L_f^2 C_{\alpha f} - 2L_r^2 C_{\alpha r})}{I_Z V_x} \dot{\psi} + \frac{2L_f C_{\alpha f}}{I_Z} \delta$$

Where,
 $d\dot{\psi}$=change in yaw rate wrt time
 $L_f$=length from CoG to front axle
 $C_{\alpha f}$=cornering stiffness of front tire
 $C_{\alpha r}$=cornering stiffness of rear tire
 $I_Z$=yaw moment of inertia of vehicle
 $V_y$=lateral velocity at the CoG of the vehicle The dynamic model predicts the rate of change of yaw rate for a given state of the vehicle and input steering angle. Input states required are the current yaw rate of the vehicle and linear velocities ($V_x$, $V_y$), which are the longitudinal and lateral velocities measured with respect to the vehicle frame at the CoG, respectively. Once the rate of change of the yaw rate is computed, it is then integrated to get the computed yaw rate (i.e. the yaw rate as estimated by the dynamic model).

In the current example, there is no clear observation for the lateral velocity and the contribution from this term is ignored. In the comparison, the lateral acceleration is limited to less than 3 m/s². In this region of operation, $V_x >> V_y$ and our $V_x$ maximum is limited to 12 m/s. Therefore, the first term in the dynamic model becomes insignificant.

The example kinematic and/or dynamic models are only as good as the parameterization of them and don't capture real world dynamics introduced due to coupling/nonlinearities of the submodules of the powertrain, the braking, the steering systems, and many other modules interacting with one another. High fidelity vehicle models (e.g., tire model, suspension model, transmission model, etc.) are not only difficult to obtain, but also difficult to tune (parameterize). They are often slow to compute or need dedicated hardware for solving problems in real time.

Alternative models try to include model and environment uncertainties in formulation by proposing filtering and estimation-based approaches. These alternatives fare better than the basic dynamic model-based implementations, but the underlying models for assumptions of these approaches still rely on the same tire model and bicycle models. Therefore, concerns for all of the mentioned models include:
1. failure to account for uncertainties introduced in transfer from real world coupling of different subsystem components of the vehicle and the difference in the energy sources for their respective powertrains;
2. being subject to errors in parameter estimation required for computing the yaw rate; kinematic model needs wheel base to be available, dynamic model needs mass distribution, inertia, and cornering stiffness (front and rear); and
3. being subject to errors in input states like velocity V for kinematic models and longitudinal velocity $V_x$ and lateral velocity $V_y$ for dynamic models.

From graph 1402, the RMSE of the yaw rate as estimated by the dynamic model is 0.0147 rad/s. As compared to the kinematic yaw rate estimation described above (e.g. 0.0173 rad/s), the dynamic model produces a 15.02% reduction in error. Additionally, utilizing transfer function 604 to generate the steering angle input to the dynamic model results in a RMSE of the estimated yaw rate of 0.0082 rad/s. Therefore, utilizing transfer function 604 as an input to the dynamic model produces a 44.21% reduction in error over the basic dynamic model.

Finally, (in this particular example) the error in the estimated yaw rate from the dynamic model with steering input from transfer function 604 is equivalent to the error (e.g. 0.0082 rad/s) in the estimated yaw rate from yaw rate model 220, which utilizes the combined, third order transfer function.

Figure 15:
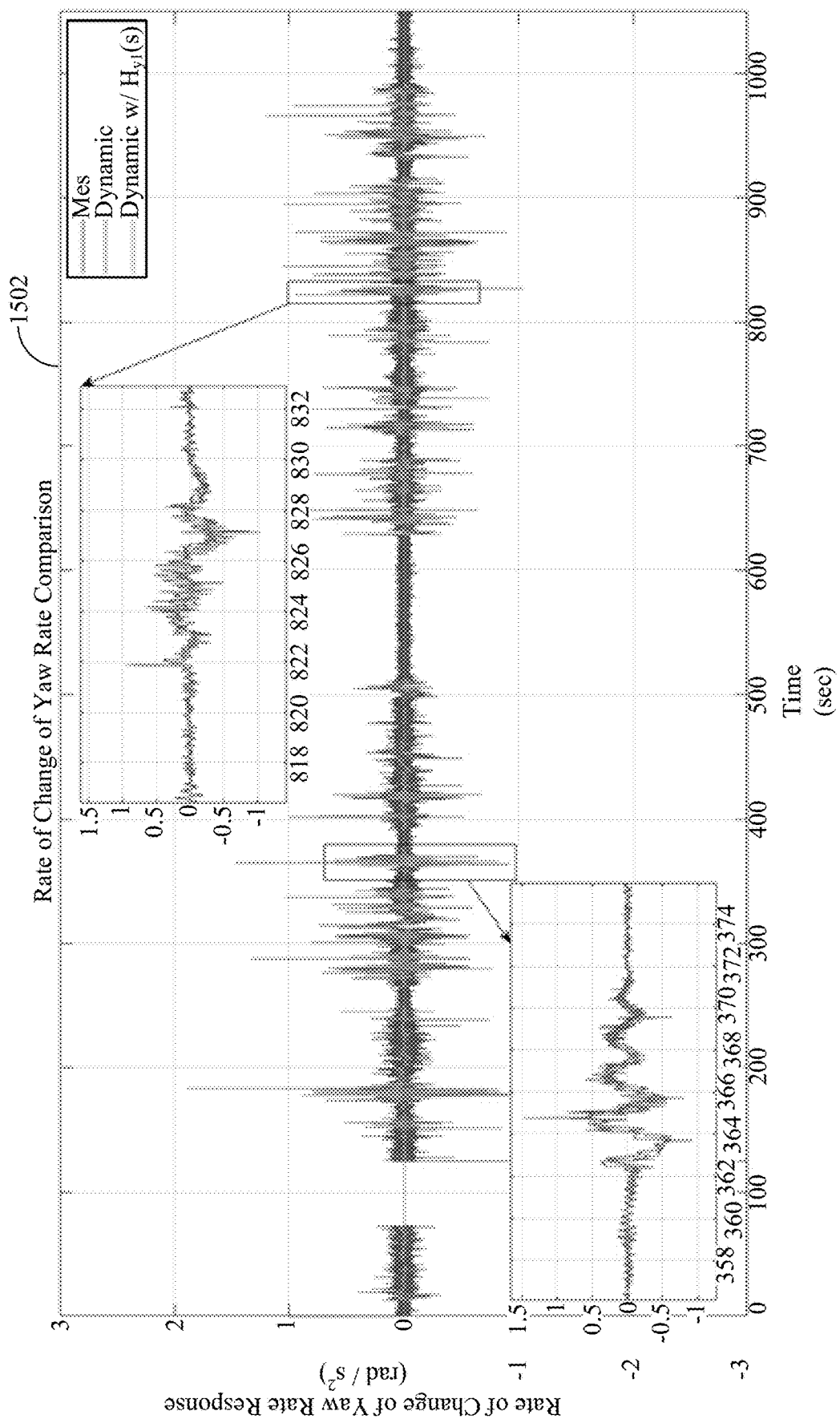
FIG. 15 is a graph showing a comparison of the measured rate of change of the yaw rate, the rate of change of the yaw rate as estimated by a dynamic model, and the rate of change of the yaw rate as predicted by the dynamic model as improved according to the steering transfer function of FIG. 6.

FIG. 15 shows a graph 1502 showing the values computed for the rate of change of the yaw rate calculated as compared to the rate of change of what is measured from the yaw rate sensor. Here, the input yaw rate is the actual measured yaw rate from the sensor at each point in time. We can see that the estimated rate of change of yaw rate is very high compared to the actual values.

Figure 16:
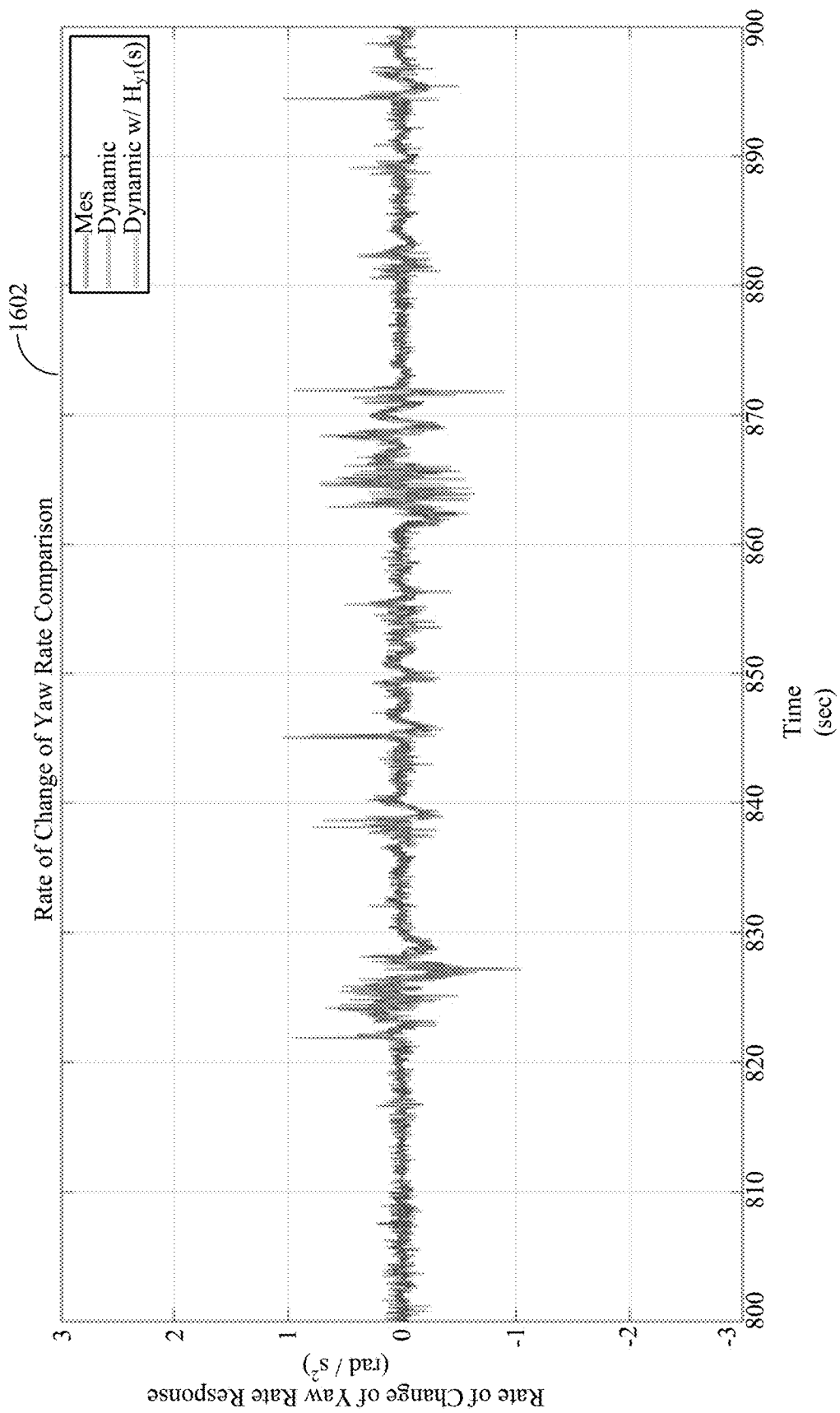
FIG. 16 is a graph showing a magnified portion of the graph of FIG. 15.

FIG. 16 shows a graph 1602, which is a magnified portion of graph 1502. Graph 1602 is zoomed in on the y-axis of graph 1502 (from 800 s to 900 s). Graph 1602 shows how well the dynamic model can predict the rate of change of the yaw rate if transfer function 604 is used to estimate the steer angle before using it as an input for the dynamic model.

The description of particular embodiments of the present invention is now complete. Many of the described features may be substituted, altered or omitted without departing from the scope of the invention. For example, alternate data sets (e.g., with higher lateral acceleration limits), may be substituted for the data of FIGS. 7A-7F. This and other deviations from the particular embodiments shown will be apparent to those skilled in the art, particularly in view of the foregoing disclosure.

We claim:

1. A method for causing a desired trajectory change in a target vehicle, said method comprising:
    providing a source vehicle being at least partially capable of autonomous driving, said source vehicle including a first inertial measurement unit (IMU) configured to measure values of a dynamic attribute associated with motion of said source vehicle;
    providing a first set of control instructions including control values of a control variable, said values of said dynamic attribute depending at least indirectly on said control values of said control variable;
    measuring particular values of said dynamic attribute during application of said control instructions to a first control system of said source vehicle during a particular time frame during which said source vehicle is in motion;
    identifying a first relationship between said particular values of said dynamic attribute and corresponding control values of said control variable of said source vehicle;
    generating a model based at least in part on said first relationship, said model being configured to map said particular values of said dynamic attribute to said corresponding control values of said control variable;
    determining said desired trajectory change for said target vehicle, said target vehicle being at least partially capable of autonomous driving and said desired trajectory change being defined by at least a subset of said particular values of said dynamic attribute;
    using said model to generate a second set of control instructions including a subset of said control values of said control variable, said second set of control instructions being generated based at least in part on said subset of said particular values of said dynamic attribute; and
    providing said second set of control instructions to a second control system of said target vehicle to execute said desired trajectory change.

2. The method of claim 1, wherein:
    said dynamic attribute is a rate of change of a vehicle yaw angle; and
    said control variable represents values of steering angle commands input to vehicle steering systems including said first control system and said second control system.

3. The method of claim 2, wherein said step of identifying said first relationship between said particular values of said dynamic attribute and said corresponding control values of said control variable of said source vehicle during said particular time frame includes:
    identifying a second relationship between said corresponding control values of said control variable and measured values of a first intermediate variable;
    identifying a third relationship between said measured values of said first intermediate variable and said particular values of said dynamic attribute; and
    identifying said first relationship based at least in part on said second relationship and said third relationship.

4. The method of claim 3, wherein said measured values of said first intermediate variable are measures of curvatures of paths of said source vehicle.

5. The method of claim 4, wherein said model is configured to multiply an input value corresponding to a longitudinal velocity of said target vehicle by a curvature of a path of said target vehicle to generate an estimate of said rate of change of said vehicle yaw angle of said target vehicle.

6. The method of claim 3, wherein said step of identifying said first relationship between said particular values of said dynamic attribute and said corresponding values of said control variable during said particular time frame includes:
    identifying a fourth relationship between said corresponding values of said control variable and measured values of a second intermediate variable;
    identifying a fifth relationship between said measured values of said second intermediate variable and said measured values of said first intermediate variable; and
    identifying said first relationship based at least in part on said fourth relationship and said fifth relationship.

7. The method of claim 6, wherein said second intermediate variable represents an angle of a steering tire with respect to a reference line associated with said source vehicle.

8. The method of claim 6, wherein said step of generating said model based at least in part on said first relationship includes:
modeling said fourth relationship as a first transfer function relating said control variable and said second intermediate variable in a first linear time invariant system; and
modeling said fifth relationship as a second transfer function relating said second intermediate variable and said first intermediate variable in a second linear time invariant system.

9. The method of claim 8, wherein said step of generating said model based at least in part on said first relationship includes:
combining said first transfer function and said second transfer function to generate a combined transfer function relating said control variable and said first intermediate variable in a third linear time invariant system.

10. The method of claim 7, wherein said step of generating said model based at least in part on said first relationship includes generating said model based at least in part on a kinematic relationship between said dynamic attribute and said second intermediate variable.

11. The method of claim 1, wherein:
said target vehicle includes a second IMU configured to measure values corresponding to said dynamic attribute associated with said target vehicle;
said first IMU has a first accuracy; and
said second IMU has a second accuracy, said first accuracy being greater than said second accuracy.

12. A system for causing a desired trajectory change in a target vehicle, said system comprising:
a source vehicle including a first inertial measurement unit (IMU) configured to measure values of a dynamic attribute associated with motion of said source vehicle, said source vehicle being at least partially capable of autonomous driving;
a modeling system configured to generate a dynamic attribute model based on data from said source vehicle; and
said target vehicle configured to receive said dynamic attribute model from said modeling system and use said model to cause said desired trajectory change in said target vehicle; and wherein
said modeling system includes a first hardware processor configured to execute code, said code of said modeling system including a first set of native instructions configured to cause said first hardware processor to perform a corresponding set of operations when executed by said first hardware processor;
said modeling system includes a hardware interface electrically coupled to said first hardware processor, configured to receive driving data recorded at least in part by said first IMU, and configured to receive a first set of control instructions including control values of a control variable, said driving data including particular values of said dynamic attribute measured during application of said first set of control instructions to a first control system of said source vehicle during a particular time frame during which said source vehicle is in motion, said particular values of said dynamic attribute depending at least indirectly on said control values of said control variable;
said modeling system includes first memory storing data and said code of said modeling system, said data including said driving data, said code including
a first subset of said first set of native instructions configured to identify a first relationship between said particular values of said dynamic attribute and said control values of said control variable of said source vehicle, and
a second subset of said first set of native instructions configured to generate said dynamic attribute model based at least in part on said first relationship, said dynamic attribute model being configured to map said particular values of said dynamic attribute to said corresponding control values of said control variable;
said target vehicle includes a second hardware processor, configured to execute a second set of native instructions, and second memory, said second memory including data and code of said target vehicle, said code of said target vehicle including
a third subset of said second set of native instructions configured to determine said desired trajectory change for said target vehicle, said target vehicle being at least partially capable of autonomous driving and said desired trajectory change being defined by at least a subset of said particular values of said dynamic attribute,
a fourth subset of said second set of native instructions configured to generate a second set of control instructions including a subset of said control values of said control variable, said second set of control instructions being generated based at least in part on said subset of said particular values of said dynamic attribute and said model, and
a fifth subset of said second set of native instructions configured to apply said second set of control instructions to a second control system of said target vehicle.

13. The system of claim 12, wherein:
said dynamic attribute is a rate of change of a vehicle yaw angle; and
said control variable represents values of steering angle commands input to vehicle steering systems including said first control system and said second control system.

14. The system of claim 13, wherein said first subset of said first set of native instructions is additionally configured to:
identify a second relationship between said corresponding control values of said control variable and measured values of a first intermediate variable;
identify a third relationship between said measured values of said first intermediate variable and said particular values of said dynamic attribute; and
identify said first relationship based at least in part on said second relationship and said third relationship.

15. The system of claim 14, wherein values of said intermediate variable represent measures of curvatures of paths of said source vehicle.

16. The system of claim 15, wherein said dynamic attribute model is configured to multiply an input value indicative of a longitudinal velocity of said target vehicle by a curvature of a path of said target vehicle to generate an estimate of said rate of change of said vehicle yaw angle of said target vehicle.

17. The system of claim 14, wherein said first subset of said first set of native instructions is additionally configured to:
- identify a fourth relationship between said corresponding values of said control variable and measured values of a second intermediate variable;
- identify a fifth relationship between said measured values of said second intermediate variable and said measured values of said first intermediate variable; and
- identify said first relationship based at least in part on said fourth relationship and said fifth relationship.

18. The system of claim 17, wherein said second intermediate variable represents an angle of a steering tire with respect to a reference line associated with said source vehicle.

19. The system of claim 17, wherein said second subset of said first set of native instructions is additionally configured to:
- model said fourth relationship as a first transfer function relating said control variable and said second intermediate variable in a first linear time invariant system; and
- model said fifth relationship as a second transfer function relating said second intermediate variable and said first intermediate variable in a second linear time invariant system.

20. The system of claim 19, wherein said second subset of said first set of native instructions is additionally configured to:
- combine said first transfer function and said second transfer function to generate a combined transfer function relating said control variable and said first intermediate variable in a third linear time invariant system.

21. The system of claim 18, wherein said second subset of said first set of native instructions is additionally configured to generate said dynamic attribute model based at least in part on a kinematic relationship between said dynamic attribute and said second intermediate variable.

22. The system of claim 12, wherein:
- said target vehicle includes a second IMU configured to measure at least said dynamic variable associated with said target vehicle;
- said first IMU has a first accuracy relative to measuring said dynamic variable; and
- said second IMU has a second accuracy relative to measuring said dynamic variable, said first accuracy being greater than said second accuracy.

* * * * *